US012707329B2

(12) United States Patent
Yi et al.

(10) Patent No.: US 12,707,329 B2
(45) Date of Patent: Aug. 11, 2026

(54) METHOD AND APPARATUS FOR TRANSMITTING AND RECEIVING SIGNAL AND COMMUNICATION SYSTEM

(71) Applicant: 1FINITY Inc., Kawasaki (JP)

(72) Inventors: Su Yi, Beijing (CN); Yang Lu, Beijing (CN); Meiyi Jia, Beijing (CN); Guorong Li, Beijing (CN)

(73) Assignee: 1FINITY Inc., Kawasaki (JP)

( * ) Notice: Subject to any disclaimer, the term of this patent is extended or adjusted under 35 U.S.C. 154(b) by 278 days.

(21) Appl. No.: 18/385,929

(22) Filed: Nov. 1, 2023

(65) Prior Publication Data

US 2024/0064572 A1 Feb. 22, 2024

Related U.S. Application Data

(63) Continuation of application No. PCT/CN2021/092913, filed on May 10, 2021.

(51) Int. Cl.
*H04W 28/08* (2023.01)
*H04W 40/24* (2009.01)
*H04W 76/12* (2018.01)

(52) U.S. Cl.
CPC ..... *H04W 28/0835* (2020.05); *H04W 40/248* (2013.01); *H04W 76/12* (2018.02)

(58) Field of Classification Search
CPC ............. H04W 36/08; H04W 36/0055; H04W 36/185; H04W 36/0069; H04W 36/12; H04W 76/30; H04W 76/15; H04W 28/0835; H04W 28/0864; H04W 76/12; H04W 36/0009; H04W 28/0252; H04W 40/02; H04W 40/24; H04W 40/22
See application file for complete search history.

(56) References Cited

U.S. PATENT DOCUMENTS

2017/0006499 A1 1/2017 Hampel et al.
2020/0413457 A1* 12/2020 Hong .................... H04W 76/10
2021/0044958 A1* 2/2021 Abedini .................. H04W 8/14
2021/0075496 A1* 3/2021 Mildh .................. H04W 40/22
2021/0168646 A1 6/2021 Chen et al.
(Continued)

FOREIGN PATENT DOCUMENTS

CN 111757553 A 10/2020
CN 112088544 A 12/2020
(Continued)

OTHER PUBLICATIONS

International Search Report and Written Opinion of the International Searching Authority issued by the China National Intellectual Property Administration for corresponding International Patent Application No. PCT/CN2021/092913, mailed on Dec. 7, 2021, with English translation.
(Continued)

*Primary Examiner* — Kwang B Yao
(74) *Attorney, Agent, or Firm* — Myers Wolin, LLC

(57) ABSTRACT

An apparatus for transmitting and receiving signals, applicable to a first integrated access and backhaul node donor central unit (IAB-donor-CU) includes a first controller configured to: transmit a traffic offload request to a second TAB-donor-CU; and receive a reply of agreement of traffic offload or a reply of rejection of traffic offload transmitted by the second TAB-donor-CU.

18 Claims, 12 Drawing Sheets

(56) References Cited

U.S. PATENT DOCUMENTS

| | | | | |
|---|---|---|---|---|
| 2021/0227435 | A1 | 7/2021 | Hsieh | |
| 2021/0321467 | A1 * | 10/2021 | Hampel | H04W 72/20 |
| 2022/0015000 | A1 * | 1/2022 | Fujishiro | H04W 40/24 |
| 2022/0248495 | A1 * | 8/2022 | Mildh | H04W 76/11 |
| 2022/0264383 | A1 * | 8/2022 | Teyeb | H04W 36/0061 |
| 2023/0232294 | A1 * | 7/2023 | Teyeb | H04W 36/0235 370/331 |
| 2023/0247504 | A1 * | 8/2023 | Haustein | H04W 76/19 455/436 |
| 2024/0163759 | A1 * | 5/2024 | Bae | H04W 36/0072 |
| 2024/0187950 | A1 * | 6/2024 | Kim | H04W 36/08 |
| 2024/0324039 | A1 * | 9/2024 | Wu | H04W 36/12 |
| 2024/0414610 | A1 * | 12/2024 | Belleschi | H04W 36/0033 |
| 2025/0184824 | A1 * | 6/2025 | Mukherjee | H04W 76/11 |

FOREIGN PATENT DOCUMENTS

| | | |
|---|---|---|
| CN | 112567796 A | 3/2021 |
| WO | 2020031004 A1 | 2/2020 |

OTHER PUBLICATIONS

Huawei, “Inter-CU topology redundancy”, Agenda Item: 13.2.3, 3GPP TSG-RAN WG3 Meeting #112-e, R3-212415, Online, May 17-27, 2021.

Fujitsu, “Discussion on inter-donor topology redundancy”, Agenda Item: 13.2.3, 3GPP TSG-RAN WG3 Meeting #112-e, R3-212048, Online, May 17-27, 2021.

3GPP TS 38.401 V16.4.0, “3rd Generation Partnership Project; Technical Specification Group Radio Access Network; NG-RAN; Architecture description (Release 16)”, Jan. 2021.

3GPP TS 38.423 V16.2.0, “3rd Generation Partnership Project; Technical Specification Group Radio Access Network; NG-RAN; Xn application protocol (XnAP) (Release 16)”, Jul. 2020.

3GPP TS 38.473 V16.2.0, “3rd Generation Partnership Project; Technical Specification Group Radio Access Network; NG-RAN; F1 application protocol (F1AP) (Release 16)”, Jul. 2020.

Notice of Reasons for Refusal issued by the Japan Patent Office for corresponding Japanese Patent Application No. 2023-569597, mailed on Nov. 6, 2024, with an English translation.

Ericsson, “On IAB Inter-donor Topology Adaptation”, Agenda Item: 8.4.3, 3GPP TSG-RAN WG2 #113bis-e, R2-2103938, Electronic meeting, Apr. 12-20, 2021.

Lenovo et al., “Discussion on SCG (de)activation rejection”, Agenda Item: 14.2, 3GPP TSG-RAN WG3 #112-e, R3-212174, Online, May 17-27, 2021.

Huawei et al., “QoS Flow Level Offloading in NR-DC”, Agenda Item: 10.3.4.3, 3GPP TSG-RAN WG2 #99, R2-1708935, Berlin, Germany, Aug. 21-25, 2017.

Samsung, “Discussion on topology redundancy for Rel-17 IAB”, Agenda Item: 13.2.3 (Topology Redundancy), 3GPP TSG-RAN WG3 #112-e, R3-211942, May 17-27, 2021.

Futurewei, “RAN2 impacts of Rel. 17 IAB topology adaptation enhancements”, Agenda Item: 8.4.3, 3GPP TSG-RAN WG2 Meeting #113 electronic bis, R2-2104152 (Revision R2-2101798), Online, Apr. 12-20, 2021.

Notice of Preliminary Rejection issued by the Korean Intellectual Property Office for corresponding Korean Patent Application No. 10-2023-7038595, mailed on Sep. 9, 2025, with an English translation.

The First Examination Report issued by the Indian Patent Office for corresponding Indian Patent Application No. 202337075614, mailed on Feb. 18, 2025, with an English translation.

The Extended European search report with the Supplementary European search report and the European search opinion, issued by the European Patent Office for corresponding European Patent Application No. 21941220.2, mailed on May 14, 2024.

ZTE et al., “Discussion on inter-Donor IAB Node Migration procedure”, Agenda Item: 13.2.1, 3GPP TSG-RAN WG3 Meeting #110-e, R3-206559, Online, Nov. 2-12, 2020.

First Notification of Office Action and Search Report issued by the China National Intellectual Property Administration for corresponding Chinese Patent Application No. 202180097986.7, mailed on Jun. 4, 2026, with an English translation.

* cited by examiner

METHOD AND APPARATUS FOR TRANSMITTING AND RECEIVING SIGNAL AND COMMUNICATION SYSTEM

CROSS-REFERENCE TO RELATED APPLICATION

This application is a continuation application of International Application PCT/CN2021/092913 filed on May 10, 2021, and designated the U.S., the entire contents of which are incorporated herein by reference.

TECHNICAL FIELD

This disclosure relates to the field of communication technologies.

BACKGROUND

Integrated access and backhaul (IAB), which is also referred to as integrated backhaul, enables a function of radio relay in a next generation radio access network (NG-RAN). An integrated access and backhaul node (IAB-node) supports access and backhaul via New Radio (NR). A termination point of NR backhaul at a network side is referred to as an IAB-donor, which denotes a network device (e.g. a gNB) supporting an IAB function.

An IAB-node may be connected to an IAB-donor via one or more hops. These multi-hop connections form a directed acyclic graph (DAG) topology with the IAB-donor as a root node. The IAB-donor is responsible for executing centralized resource management, topology management and routing management in an IAB network topology.

The IAB-node supports a function of a gNB-DU (distributed unit), and an IAB-node DU is also referred to as an IAB-DU, which is an end point of a New Radio access (NR access) interface to a terminal equipment (UE) and a next hop IAB-node and is also an end point of an F1 protocol to a gNB-CU (central unit) on the IAB-node. The IAB-DU may serve for a common UE and an IAB child node. The IAB-DU enables functions of a network side device, is connected to a downstream child IAB-node, provides NR air-interface access for UEs and downstream IAB child nodes, and sets up F1 connection to an IAB donor-CU.

In addition to the function of the gNB-DU, the IAB-node also supports some functions of the UE, referred to as an IAB-MT (mobile termination). The IAB-MT includes, for example, a physical layer, layer 2, RRC and NAS functions to be connected to a gNB-DU on another IAB-node or IAB-donor, a gNB-CU on the IAB-donor and a core network. The IAB-MT may support such functions as a UE physical layer, an access stratum (AS), a radio resource control (RRC) layer and a non-access stratum (NAS), and may be connected to an IAB parent node.

An IAB-donor is a terminating node at a network side, and provides access to a network for an IAB-MT or UE via a backhaul or access link. The IAB-donor is further classified as an IAB-donor-CU (central unit) and an IAB-donor-DU. The IAB-DU and IAB-donor-CU are connected via an F1 interface. In a scenario of independent networking, a gNB and the IAB-donor-CU are connected via an Xn interface.

In order to support multi-hop routing forwarding of a data packet, a backhaul adaptation protocol (BAP) sublayer is introduced in IAB. The BAP sublayer is located above a radio link control (RLC) sublayer and below an IP layer, and supports such functions as packet destination node and path selection, packet routing forwarding, bearer mapping, flow control feedback, and notification of backhaul link failure.

FIG. 1 is a schematic diagram of the IAB topology. As shown in FIG. 1, in an IAB topology 10, an IAB-node 100 includes an IAB-MT functional unit 101 and an IAB-DU functional unit 102, neighboring nodes connected to an interface of the IAB-DU functional unit 102 are referred to as child nodes, such as child nodes 201, 202 and 203 shown in FIG. 1, the IAB-DU functional unit 102 may be in communication with the child nodes 201, 202 and 203 via an air interface (Uu), neighboring nodes connected to an interface of the IAB-MT functional unit 101 are referred to as parent nodes, such as parent nodes 301 and 302 shown in FIG. 1, and the IAB-MT functional unit 101 may be in communication with the parent nodes 301 and 302 via an air interface (Uu).

As shown in FIG. 1, a direction from IAB-node 100 to child nodes 201, 202 and 203 is referred to as a downstream direction, and a direction from IAB-node 100 to parent nodes 301 and 302 is referred to as an upstream direction. And an IAB-donor (not shown) executes centralized resource management, topology management and routing management for the IAB topology 10.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

Topology redundancy refers to setup of a redundant path, also known as a second path, for an IAB-node in an IAB topology network, so as to offload some services from a topology network to another topology network, that is, transmitting data via a redundant path. A main purpose of topology redundancy is to balance service loads, reduce service interruption, and improve network robustness.

In an existing intra-CU topology redundancy procedure, setup and release of redundant paths may be performed in an IAB topology under the same IAB-donor-CU, and a certain degree of path diversity and load balancing may be achieved in the procedure. If load saturation is reached in the topology network under the same IAB-donor-CU, performances of services is affected. Inter-CU topology redundancy may further improve path diversity and better meet requirements for load balancing.

However, it was found by the inventors that there currently exists no corresponding solution for how to set up or release an inter-CU topology redundant path.

Embodiments of this disclosure provide a method and apparatus for transmitting and receiving a signal and a communication system, wherein a first IAB-donor-CU transmits a traffic offloading request to a second IAB-donor-CU, and the second IAB-donor-CU transmits to the first IAB-donor-CU a response of agreement of traffic offloading or a response of rejection of traffic offloading. Hence, a redundant path may be set up between a network topology of the first IAB-donor-CU and a network topology of the second IAB-donor-CU, thereby further improving path diversity, and better satisfying requirements for load balancing and service interruption reduction.

According to an aspect of the embodiments of this disclosure, there is provided an apparatus for transmitting and receiving a signal, applicable to a first integrated access and backhaul node donor central unit (IAB-donor-CU), the apparatus including a first transceiving unit configured to:

transmit a traffic offloading request, i.e. a redundant path setup request, to a second IAB-donor-CU; and receive a response of agreement of traffic offloading or a response of rejection of traffic offloading transmitted by the second IAB-donor-CU.

According to another aspect of the embodiments of this disclosure, there is provided an apparatus for transmitting and receiving a signal, applicable to a second integrated access and backhaul node donor central unit (IAB-donor-CU), the apparatus including a second transceiving unit configured to:

receive a traffic offloading request transmitted by a first IAB-donor-CU; and transmit a response of agreement of traffic offloading or a response of rejection of traffic offloading to the first IAB-donor-CU.

According to a further aspect of the embodiments of this disclosure, there is provided an apparatus for transmitting and receiving a signal, applicable to an IAB-node, the IAB-node being connected to a first parent node, and the IAB-node being already or being to be connected to a second parent node, the first parent node being a node in topology of a first IAB-donor-CU, and the second parent node being a node in topology of a second IAB-donor-CU, the apparatus including a third transceiving unit configured to:

receive a first RRC reconfiguration message transmitted by the first IAB-donor-CU; and transmit an RRC reconfiguration complete message to the first IAB-donor-CU, wherein the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the IAB-node, the TNL address being anchored to a second IAB-donor-DU in topology of the second IAB-donor-CU;

and wherein the RRC reconfiguration complete message is used to indicate that the IAB-node has received the first RRC reconfiguration message.

According to still another aspect of the embodiments of this disclosure, there is provided an apparatus for transmitting and receiving a signal, applicable to a descendant node of an IAB-node, the IAB-node being connected to a first parent node, and the IAB-node being already or being to be connected to a second parent node, the first parent node being a node in topology of a first IAB-donor-CU, and the second parent node being a node in topology of a second IAB-donor-CU, the apparatus including a fourth transceiving unit configured to:

receive a first RRC reconfiguration message transmitted by the first IAB-donor-CU; and transmit an RRC reconfiguration complete message to the first IAB-donor-CU, wherein the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the descendant node, the TNL address being anchored to a second IAB-donor-DU in topology of the second IAB-donor-CU;

and wherein the RRC reconfiguration complete message is used to indicate that the descendant node has received the first RRC reconfiguration message.

According to yet another aspect of the embodiments of this disclosure, there is provided a method for transmitting and receiving a signal, corresponding to the apparatus for transmitting and receiving a signal as described in any one of the above aspects.

An advantage of the embodiments of this disclosure exists in that the first IAB-donor-CU transmits a traffic offloading request to a second IAB-donor-CU, and the second IAB-donor-CU transmits to first IAB-donor-CU a response of agreement of traffic offloading or a response of rejection of traffic offloading. Hence, a redundant path may be set up between a network topology of the first IAB-donor-CU and a network topology of the second IAB-donor-CU.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "include/contain/comprise" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE DISCLOSURE

Figure 1:
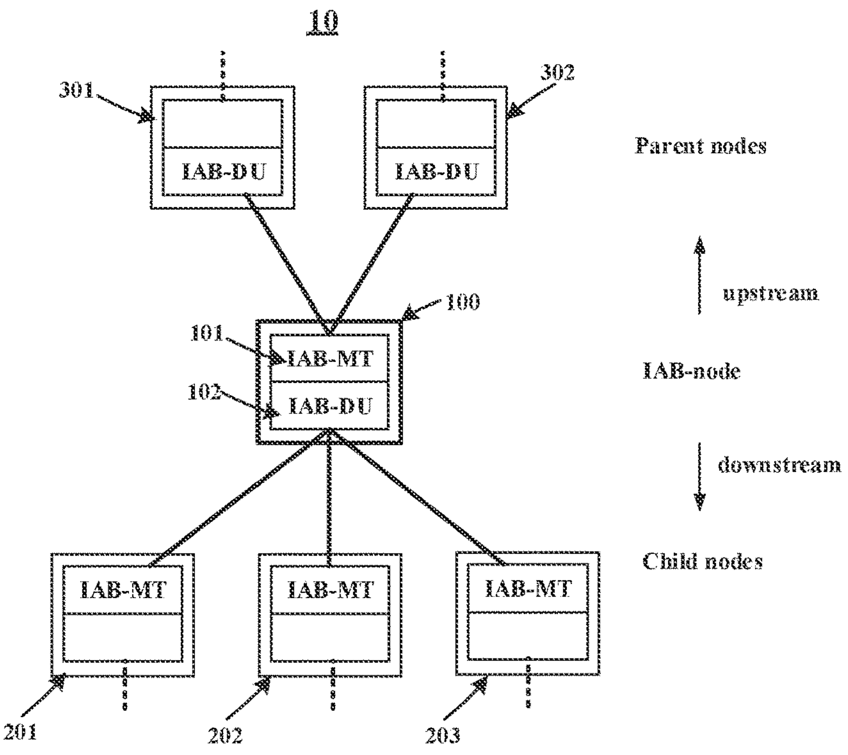
FIG. 1 is a schematic diagram of an IAB topology.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above.

In the embodiments of this disclosure, higher-layer signaling may be, for example, radio resource control (RRC) signaling; for example, it is referred to an RRC message, which includes MIB, system information, and a dedicated RRC message; or, it is referred to an as RRC IE (RRC information element). Higher-layer signaling may also be, for example, F1-C signaling, or an F1AP protocol; however, this disclosure is not limited thereto.

In the embodiments of this disclosure, a plurality of UEs are connected to an IAB-donor via a multi-hop IAB-nodes, and are finally connected to a network, the network being, for example, a 5G network.

Figure 2:
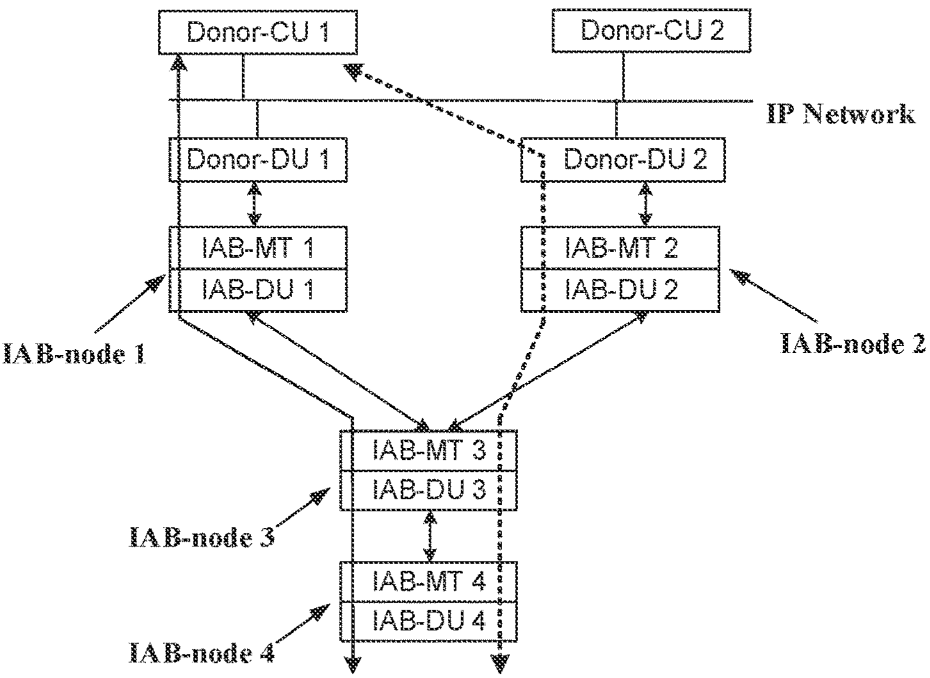
FIG. 2 shows an example of a topology transmission path in a scenario of inter-CU topology redundancy.

FIG. 2 shows an example of a topology transmission path in a scenario of inter-CU topology redundancy. Donor-CU 1 in FIG. 2 is also referred to as IAB-donor-CU 1, and Donor-CU 2 is also referred to as IAB-donor-CU 2.

As shown in FIG. 2, Donor-CU 1 is an F1 terminating donor of IAB-node 3 and IAB-node 4. IAB-node 3 is a dual-connecting node and has two paths to Donor-CU 1. IAB-node 4 may also have two paths to Donor-CU 1. Taking that IAB-node 4 serves as an access IAB-node as an example, some data between IAB-node 4 and Donor-CU 1 are transmitted via a topology network (referred to as a first path, as shown by the arrow in solid lines) controlled by Donor-CU 1, and some data are transmitted via a topology network (referred to as a second path, as shown by the arrow in dashed lines) controlled by Donor-CU 2, thereby achieving a goal of data diversion and load balancing. Similarly, IAB-node 3 and other descendant nodes of IAB-node 3 (not shown in the figure) may also serve as access IAB-nodes to set up second paths.

In FIG. 2, IAB-node 1 is a first parent node of IAB-node 3, IAB-node 2 is a second parent node of IAB-node 3, and IAB-node 4 is a descendant node of IAB-node 3. For simplicity, a UE under IAB-node 4 in the figure is not shown.

In various embodiments of this disclosure, the first IAB-donor-CU may be Donor-CU 1 in FIG. 2, the second IAB-donor-CU may be Donor-CU 2 in FIG. 2, the IAB-node may be IAB-node 3 in FIG. 2, the descendant node of IAB-node 3 may be IAB-node 4 in FIG. 2, the first parent node of IAB-node 3 may be IAB-node 1 in FIG. 2, the second parent node of IAB-node 3 may be IAB-node 2 in FIG. 2, the first parent node of IAB-node 3 (such as IAB-node 1) is a node within topology of the first IAB-donor-CU, the second parent node of IAB-node 3 (such as IAB-node 2) is a node within topology of the second IAB-donor-CU, and the second IAB-donor-DU may be donor-DU 2 in FIG. 2.

In FIG. 2, in a case where both the first and second paths are set up, IAB-node 3 is connected to the first parent node (such as IAB-node 1), and IAB-node 3 is connected to the second parent node (such as IAB-node 2). In addition, before the second path is set up (i.e. before the method for transmitting and receiving a signal in this disclosure is executed), IAB-node 3 and the second parent node (e.g. IAB-node 2) may be in a connected state or an unconnected (i.e. to be connected) state.

In the embodiments of this disclosure, the access IAB-node includes an IAB-node (such as IAB-node 3 in FIG. 2) and/or a descendant node of the IAB-node (such as IAB-node 4 in FIG. 2), or an IAB-node that is about to be a dual-connecting node (such as a node about to be connected to the first IAB-donor-CU and the second IAB-donor-CU).

In the embodiments of this disclosure, the IAB-DU may denote a distributed unit of the IAB-node, i.e. a DU of the IAB, and the IAB-MT may denote a mobile terminal of the IAB-node, i.e. an MT of the IAB.

In the embodiments of this disclosure, a node within topology of the donor-CU refer to that a DU part of the node is managed by the donor-CU, that is, an F1 interface of the node terminates at the donor-CU.

In various embodiments of this disclosure, meanings of the donor-CU and the IAB-donor-CU are identical, and may be interchangeable.

Embodiment of a First Aspect

The embodiment of the first aspect of this disclosure provides a method for transmitting and receiving a signal, applicable to a first integrated access and backhaul node donor central unit (IAB-donor-CU). The method for transmitting and receiving a signal shall be described in the embodiment of the first aspect of this disclosure from a side of a first IAB-donor-CU, wherein the first IAB-donor-CU may be, for example, donor-CU 1 in FIG. 2.

Figure 3:
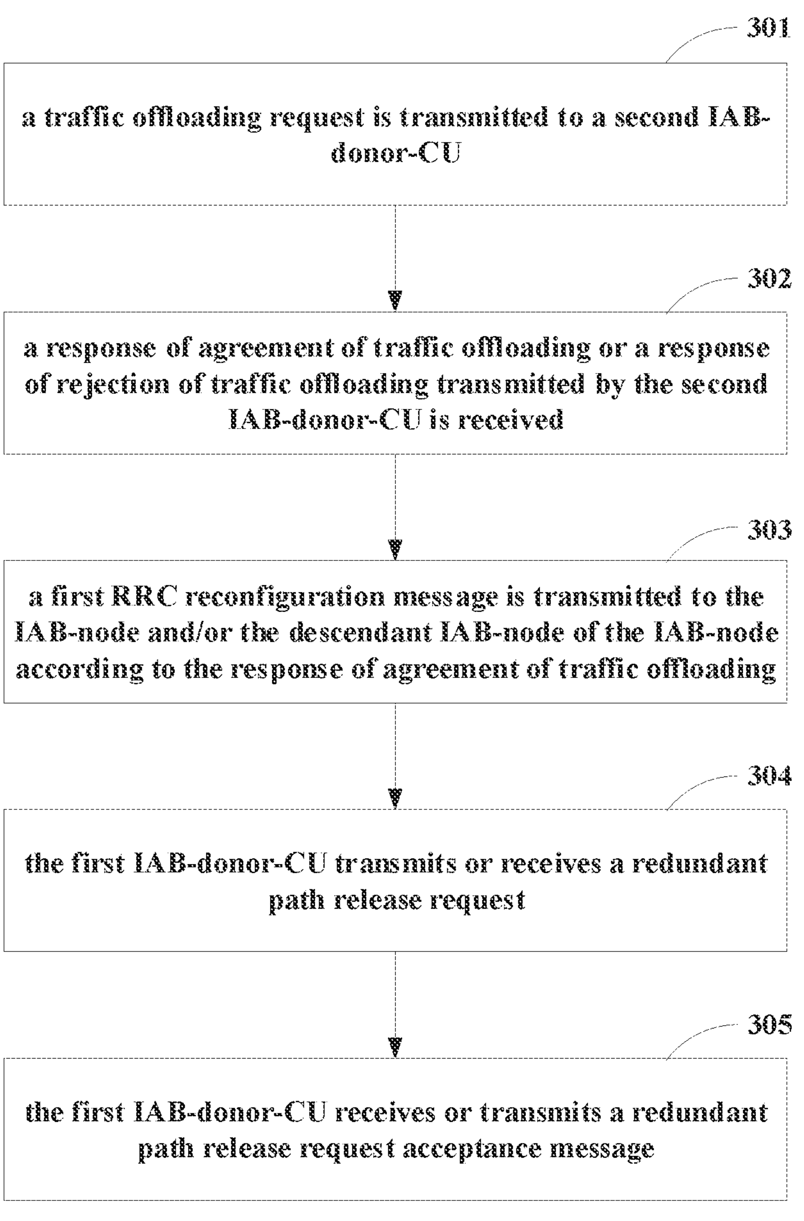
FIG. 3 is a schematic diagram of the method for transmitting and receiving a signal of an embodiment of a first aspect.

FIG. 3 is a schematic diagram of the method for transmitting and receiving a signal of the embodiment of the first aspect. As shown in FIG. 3, the method includes:

operation 301: a traffic offloading request is transmitted to a second IAB-donor-CU; and operation 302: a response of agreement of traffic offloading or a response of rejection of traffic offloading transmitted by the second IAB-donor-CU is received.

In this disclosure, operations 301 and 302 may support topology redundancy between the first IAB-donor-CU and the second IAB-donor-CU, thereby further improving path diversity and better satisfying requirements for load balancing.

In at least one embodiment, the traffic offloading request transmitted in operation 301 includes a request for setting up cross-donor redundant paths for the IAB-node and/or a descendant of the IAB-node.

For example, the first IAB-donor-CU configures a backhaul radio link control (BH RLC) channel and a routing entry of a BAP sublayer between the IAB-node and its descendant node, so as to support mapping of the routing of the second path and BH RLC channel of the second path, thereby setting up a redundant path for the descendant node; furthermore, the first IAB-donor-CU may perform configuration of BAP routing identification mapping for the IAB-node according to the response of agreement of traffic offloading. Hence, at the IAB-node, BAP routing conversion between topology of the first path controlled by the first IAB-donor-CU and topology of the second path controlled by the second IAB-donor-CU may be performed, thereby setting up a redundant path for descendant node; moreover, the first IAB-donor-CU may migrate an F1-U path between the first IAB-donor-CU and the IAB-node and/or a DU of the descendant node of the IAB-node from the first path to the second path via a UE context modification request message or a UE context setup request message, thereby setting up redundant paths for the IAB-node and/or the descendant node.

In at least one embodiment, the response of agreement of traffic offloading in operation 302 may indicate that the traffic offloading request is at least partially accepted, wherein that the traffic offloading request is at least partially accepted refers to that redundant paths are set up for some TNL-associated F1-Cs or for some F1-U tunnels.

In at least one embodiment, in a case where the IAB-node is connected to the first parent node and the IAB-node is also connected to the second parent node, the traffic offloading request may be included in a traffic offloading request message, the traffic offloading request message being, for example, a TRAFFIC OFFLOAD REQUEST message or a Redundant Path Establishment Request message; the response of agreement of traffic offloading may be included in a traffic offloading request acknowledge message, such as a TRAFFIC OFFLOAD REQUEST ACKNOWLEDGE message; and the response of rejection of traffic offloading may be included in a traffic offloading rejection message, such as a TRAFFIC OFFLOAD REQUEST REJECT message.

In one implementation, the traffic offloading request message may include an identifier of a user equipment of a traffic offloading initiating node at an Xn interface (UE XnAP ID), and/or identification information of one or more F1-Cs. The traffic offloading initiating node refers to the first IAB-donor-CU, the user equipment refers to the access IAB-node (the IAB-node serves as the user equipment of the IAB-donor), and the identification information of one or more F1-Cs is used to establish redundant paths for one or more F1-Cs of the access IAB-node.

In another implementation, the traffic offloading request message includes at least one of the following information: an identifier of a user equipment of a traffic offloading initiating node at an Xn interface (UE XnAP ID), a BAP address of an access IAB-node, a TNL address, one or more pieces of F1-U tunnel identification information, IP header information of an F1-C and/or F1-U tunnels, and QoS information of the F1-U tunnels.

In the above two implementations, in a case where traffic offloading requests for at least a part of F1-Cs and/or F1-U tunnels are accepted, the traffic offloading request acceptance message may include at least one of the following information:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, or a second BAP address of the IAB-node. The traffic offloading accepting node refers to the second IAB-donor-CU, the UE XnAP ID of a traffic offloading accepting node refers to an Xn interface identifier of the access IAB-node within a node of the second IAB-donor-CU. According to whether the traffic initiating node and the traffic accepting node correspond to an MN or an SN, the UE XnAP ID of the traffic offloading initiating node and the UE XnAP ID of the traffic offloading accepting node may also be referred to as an M-NG-RAN node UE XnAP ID (a UE XnAP ID of a primary base station node) or an S-NG-RAN node UE XnAP ID (a UE XnAP ID of a secondary base station node), respectively.

In the above two implementations, in a case where traffic offloading requests for all F1-Cs and F1-U tunnels are rejected, the second IAB-donor-CU transmits the traffic offloading request reject message, the traffic offloading request reject message including a UE XnAP ID of the traffic offloading initiating node.

In at least one embodiment, in a case where the IAB-node is connected to the first parent node and the IAB-node is also connected to the second parent node, if the first IAB-donor-CU is a master node (MN), contents of the traffic offloading request and contents of the response of agreement of traffic offloading or contents of the response of rejection of traffic offloading are taken as information elements (IEs) and contained in messages of an S-NG-RAN node modification preparation procedure of an XnAP.

In at least one other embodiment, in a case where the IAB-node is connected to the first parent node and the IAB-node is not connected to the second parent node, contents of the traffic offloading request and contents of the response of agreement of traffic offloading or contents of the response of rejection of traffic offloading are taken as information elements (IIEs) and contained in a message of an S-NG-RAN node addition preparation process of an XnAP.

For example, the traffic offloading request may be included in a secondary node addition request (S-NODE ADDITION REQUEST) message transmitted by the first IAB-donor-CU to the second IAB-donor-CU. For example, the response of agreement of traffic offloading may be included in a secondary node addition request acknowledge (S-NODE ADDITION REQUEST ACKNOWLEDGE) message transmitted by the second IAB-donor-CU to the first IAB-donor-CU.

As shown in FIG. 3, the method further includes:

operation 303: a first RRC reconfiguration message is transmitted to the IAB-node and/or the descendant IAB-node of the IAB-node according to the response of agreement of traffic offloading.

In operation 303, the first RRC reconfiguration message may include at least one transport network layer (TNL, or transport layer) address allocated respectively for a DU of the IAB-node (such as IAB-node 3 in FIG. 2) and/or that of the descendant node of the IAB-node (such as IAB-node 4 in FIG. 2), the TNL address being anchored to a second IAB-donor-DU in the topology of the second IAB-donor-CU (such as donor-DU 2 in FIG. 2).

In operation 303, the BAP configuration information element (bap-Config IE) of the first RRC reconfiguration message includes a field used for indicating a second BAP address configured for the IAB-node, the field being, for example, bap-Address-redundant, or bap-Address-second, etc., used for indicating that it is the second BAP address; or the BAP address field in the BAP configuration information element (bap-Config IE) of the first RRC reconfiguration message includes a list, each entry in the list being a BAP address and its associated information. For example, the list may be bap-AddressList, each entry in the list being a BAP address and its associated information, and each entry being, for example, {bap-Address, 'MCG'/SCG' }, or {bap-Address, iab-donor-DU-BAP-Address}, etc. Hence, a second BAP address may be allocated for IAB-node 3, the second BAP address being able to be used for BAP routing configuration on the redundant path (i.e. the second path passing donor-DU 2).

In at least one embodiment, in a case where a new TNL address is allocated for the IAB-node and/or its descendant in operation 303, the first IAB-donor-CU may add the new TNL address to the F1-C association between the DU of the IAB-node and/or its descendant and the first IAB-donor-CU.

As shown in FIG. 3, the method for transmitting and receiving a signal may further include:

operation 304: the first IAB-donor-CU transmits or receives a redundant path release request; and operation 305: the first IAB-donor-CU receives or transmits a redundant path release request acceptance message.

For example, the first IAB-donor-CU transmits the redundant path release request to the second IAB-donor-CU, and the first IAB-donor-CU receives the redundant path release request acceptance message from the second IAB-donor-CU; for another example, the first IAB-donor-CU receives the redundant path release request transmitted by the second IAB-donor-CU, and the first IAB-donor-CU transmits the redundant path release request acceptance message to the second IAB-donor-CU.

In at least one embodiment, the redundant path release request includes a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path, wherein the redundant path is, for example, the second path shown in FIG. 2.

In at least one embodiment, in a case where master modes (MNs) in the first IAB-donor-CU and the second IAB-donor-CU transmit redundant path release requests, contents of the redundant path release request and contents of the redundant path release request acceptance message are taken as IEs and contained in the S-NG-RAN node modification preparation procedure.

In at least one embodiment, in performing a secondary base station node release (S-NG-RAN node Release) process of the IAB-node, all redundant paths related to the IAB-node in the SN topology are released.

According to the embodiment of the first aspect of this disclosure, setup of a redundant path between the first IAB-donor-CU and the second IAB-donor-CU may be supported, thereby further improving path diversity, and better satisfying requirements for load balancing and service interruption reduction. And furthermore, the topology redundant path between the first IAB-donor-CU and the second IAB-donor-CU may be released.

Embodiment of a Second Aspect

At least addressed to the same problem as the embodiment of the first aspect, the embodiment of the second aspect of this disclosure provides a method for transmitting and receiving a signal, corresponding to the method of the embodiment of the first aspect. The method for transmitting and receiving a signal of the embodiment of the second aspect is applicable to a second integrated access and backhaul node donor central unit (IAB-donor-CU). The method for transmitting and receiving a signal shall be described in the embodiment of the second aspect of this disclosure from a side of a second IAB-donor-CU, wherein the second IAB-donor-CU may be, for example, donor-CU 2 in FIG. 2.

Figure 4:
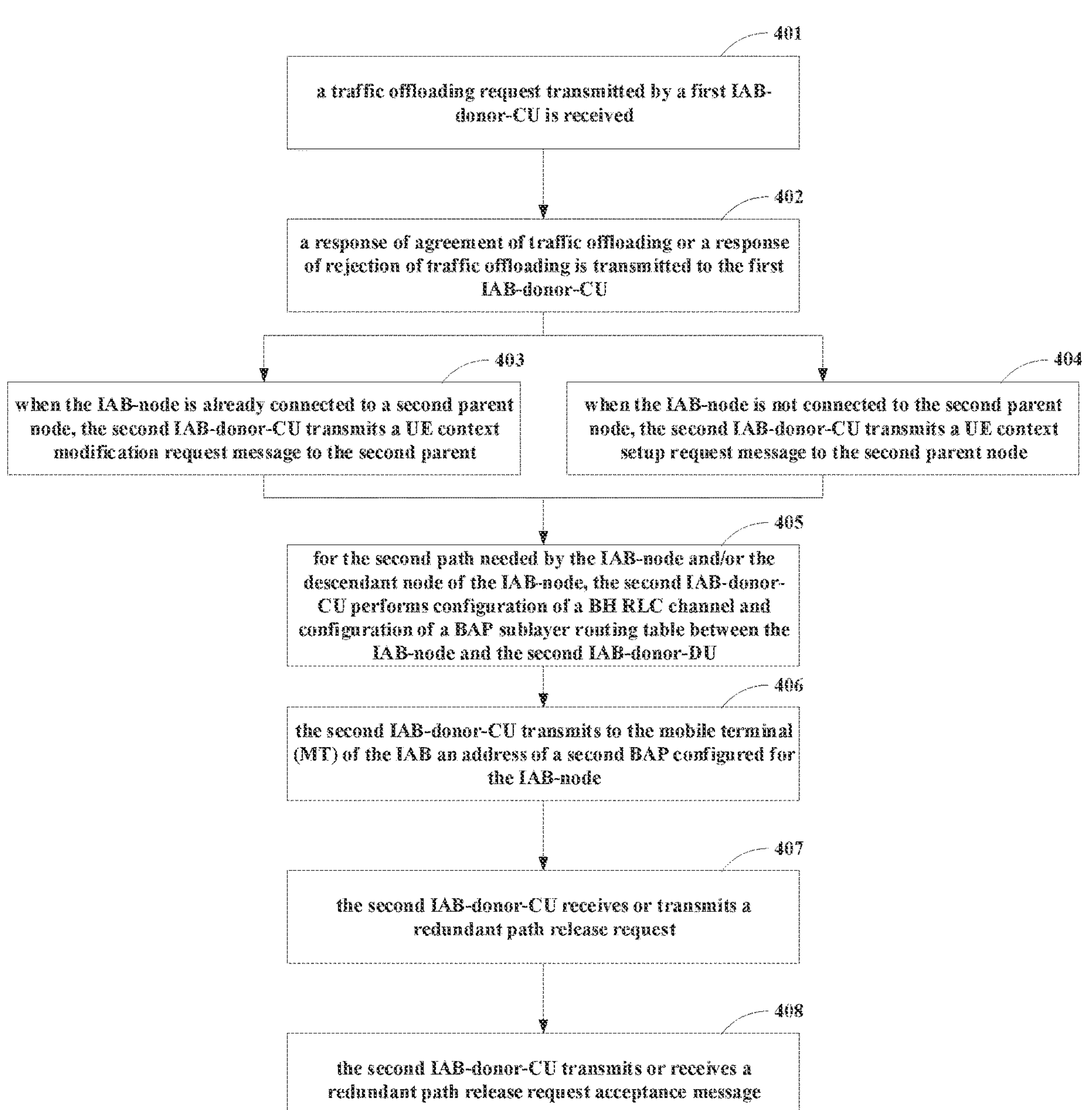
FIG. 4 is a schematic diagram of the method for transmitting and receiving a signal of an embodiment of a second aspect.

FIG. 4 is a schematic diagram of the method for transmitting and receiving a signal of the embodiment of the second aspect. As shown in FIG. 4, the method includes:

operation 401: a traffic offloading request transmitted by a first IAB-donor-CU is received; and operation 402: a response of agreement of traffic offloading or a response of rejection of traffic offloading is transmitted to the first IAB-donor-CU.

In this disclosure, operations 401 and 402 may support topology redundancy between the first IAB-donor-CU and the second IAB-donor-CU, thereby further improving path diversity and better satisfying requirements for load balancing.

In at least one embodiment, the traffic offloading request in operation 401 includes a request for setting up a redundant path for an IAB-node (such as IAB-node 3 in FIG. 2) and/or a descendant node of the IAB-node (such as IAB-node 4 in FIG. 2).

The response of agreement of traffic offloading in operation 402 indicates that the traffic offloading request is at least partially accepted, wherein that the traffic offloading request is at least partially accepted refers to that redundant paths are set up for some TNL-associated F1-Cs or for some F1-U tunnels.

In a case where the IAB-node is connected to a first parent node and the IAB-node is connected to a second parent node, the traffic offloading request may be included in a traffic offloading request message, the response of agreement of traffic offloading may be included in a traffic offloading request acknowledge message, the traffic offloading request acknowledge message being, for example, a TRAFFIC OFFLOAD REQUEST ACKNOWLEDGE message, and the response of rejection of traffic offloading may be included in a traffic offloading reject message, the traffic offloading reject message being, for example, TRAFFIC OFFLOAD REQUEST REJECT.

The traffic offloading request message may include an identifier of a user equipment of a traffic offloading initiating node at an Xn interface (UE XnAP ID), and/or identification information of one or more F1-Cs. The identification information of one or more F1-Cs is used to establish redundant paths for one or more F1-Cs of the access IAB-node, and the access IAB-node includes an IAB-node and/or a descendant node of the IAB-node, or an IAB-node that is about to be a dual-connecting node.

The traffic offloading request message may include at least one of the following: a UE XnAP ID of a traffic offloading initiating node, a BAP address of an access IAB-node, a TNL address, one or more pieces of F1-U tunnel identification information, IP header information of an F1-C and/or F1-U tunnels, or QoS information of the F1-U tunnels.

In at least one embodiment, in a case where a traffic offloading request for an F1-C and/or F1-U tunnel is accepted, the traffic offloading request acknowledge message may include at least one of the following:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, or a second BAP address of the IAB-node, wherein the traffic offloading accepting node refers to the second IAB-donor-CU, and the UE XnAP ID of a traffic offloading accepting node refers to an Xn interface identifier of the access IAB-node within a node of the second IAB-donor-CU.

Furthermore, in a case where traffic offloading requests for all F1-Cs and F1-U tunnels are rejected, the second IAB-donor-CU may transmit the traffic offloading request reject message to the first IAB-donor-CU, the traffic offloading request reject message including a UE XnAP ID of the traffic offloading initiating node.

In at least one embodiment, in a case where the IAB-node is connected to the first parent node and the IAB-node is connected to the second parent node, if the first IAB-donor-CU is a master node (MN), contents of the traffic offloading request and contents of the response of agreement of traffic offloading or contents of the response of rejection of traffic offloading are taken as information elements (IEs) and contained in messages of an S-NG-RAN node modification preparation procedure of an XnAP.

In at least one embodiment, in a case where the IAB-node is connected to the first parent node and the IAB-node is not connected to the second parent node, contents of the traffic offloading request and contents of the response of agreement of traffic offloading or contents of the response of rejection of traffic offloading are taken as information elements (IEs) and contained in a message of an S-NG-RAN node addition preparation process of an XnAP.

For example, the traffic offloading request is included in a secondary node addition request (S-NODE ADDITION REQUEST) message transmitted by the first IAB-donor-CU to the second IAB-donor-CU. For another example, the response of agreement of traffic offloading is included in a secondary node addition request acknowledge (S-NODE ADDITION REQUEST ACKNOWLEDGE) message transmitted by the second IAB-donor-CU to the first IAB-donor-CU.

As shown in FIG. 4, the method further includes:

operation 403: when the IAB-node is already connected to a second parent node, the second IAB-donor-CU transmits a UE context modification request message to the second parent node to modify a user equipment (UE) context of a mobile terminal (MT) of the IAB-node, and sets at least one bearer; or operation 404: when the IAB-node is not connected to the second parent node, the second IAB-donor-CU transmits a UE context setup request message to the second parent node to set up a UE context of an MT of the IAB, and sets at least one bearer.

As shown in FIG. 4, the method further includes:

operation 405: for the second path needed by the IAB-node and/or the descendant node of the IAB-node, the second IAB-donor-CU performs configuration of a BH RLC channel and configuration of a BAP sublayer routing entry between the IAB-node and the second IAB-donor-DU.

As shown in FIG. 4, the method further includes:

operation 406: the second IAB-donor-CU transmits to the mobile terminal (MT) of the IAB an address of a second BAP configured for the IAB-node.

In operation 406, the second IAB-donor-CU may transmit a second reconfiguration (RRCReconfiguration) message to the mobile terminal (MT) of the IAB-node, the second RRCReconfiguration message including BAP configuration information (bap-Config), the BAP configuration information including the address of the second BAP configured for the IAB-node.

In this disclosure, the second path may be set for the IAB-node in operations 403-403.

As shown in FIG. 4, the method further includes:

operation 407: the second IAB-donor-CU receives or transmits a redundant path release request; and operation 408: the second IAB-donor-CU transmits or receives a redundant path release request acceptance message.

For example, in operation 407, the second IAB-donor-CU receives the redundant path release request transmitted by the first IAB-donor-CU, and in operation 408, the second IAB-donor-CU transmits the redundant path release request acceptance message to the first IAB-donor-CU. For another example, in operation 407, the second IAB-donor-CU transmits the redundant path release request to the first IAB-donor-CU, and in operation 408, the second IAB-donor-CU receives the redundant path release request acceptance message transmitted by the first IAB-donor-CU.

In at least one embodiment, the redundant path release request in operation 407 includes: a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path, wherein the redundant path is the second path shown in FIG. 2.

In a case where MNs in the first IAB-donor-CU and the second IAB-donor-CU transmit redundant path release requests, contents of the redundant path release request and contents of the redundant path release request acceptance message are taken as IEs and contained in the S-NG-RAN node modification preparation procedure.

In performing a secondary base station node release (S-NG-RAN node Release) process of the IAB-node, all redundant paths related to the IAB-node (such as IAB-node 3 shown in FIG. 2) in the SN topology are released.

According to the embodiment of the second aspect of this disclosure, establishment of a topology redundant path between the first IAB-donor-CU and the second IAB-donor-CU may be supported, thereby further improving diversity of paths and better satisfying the requirements of load balancing; and furthermore, the topology redundant path between the first IAB-donor-CU and the second IAB-donor-CU may be released.

The method for transmitting and receiving a signal in the embodiment of the first aspect and the method for transmitting and receiving a signal in the embodiment of the second aspect shall be described in detail with reference to specific embodiments.

Embodiment 1

In Embodiment 1, the IAB-node (such as IAB-node 3 shown in FIG. 2) is in a state where it is already dual-connected to two different IAB-donor-CUs. Therefore, in Embodiment 1, IAB-node 3 is also referred to as a dual-connecting IAB-node.

As the F1 interface may be established after the MT of the IAB-node is connected to two different donors, an F1 terminating node may either be an MN or an SN. On the first path, the first IAB-donor-CU (such as IAB-donor-CU 1 in FIG. 2) is the F1-terminating node, which may be a master node (MN) or a secondary node (SN) in this embodiment. On the second path, the second IAB-donor-CU (such as IAB-donor-CU 2 in FIG. 2) is a non-F1-terminating node, which may be SN or MN in this embodiment.

Figure 5:
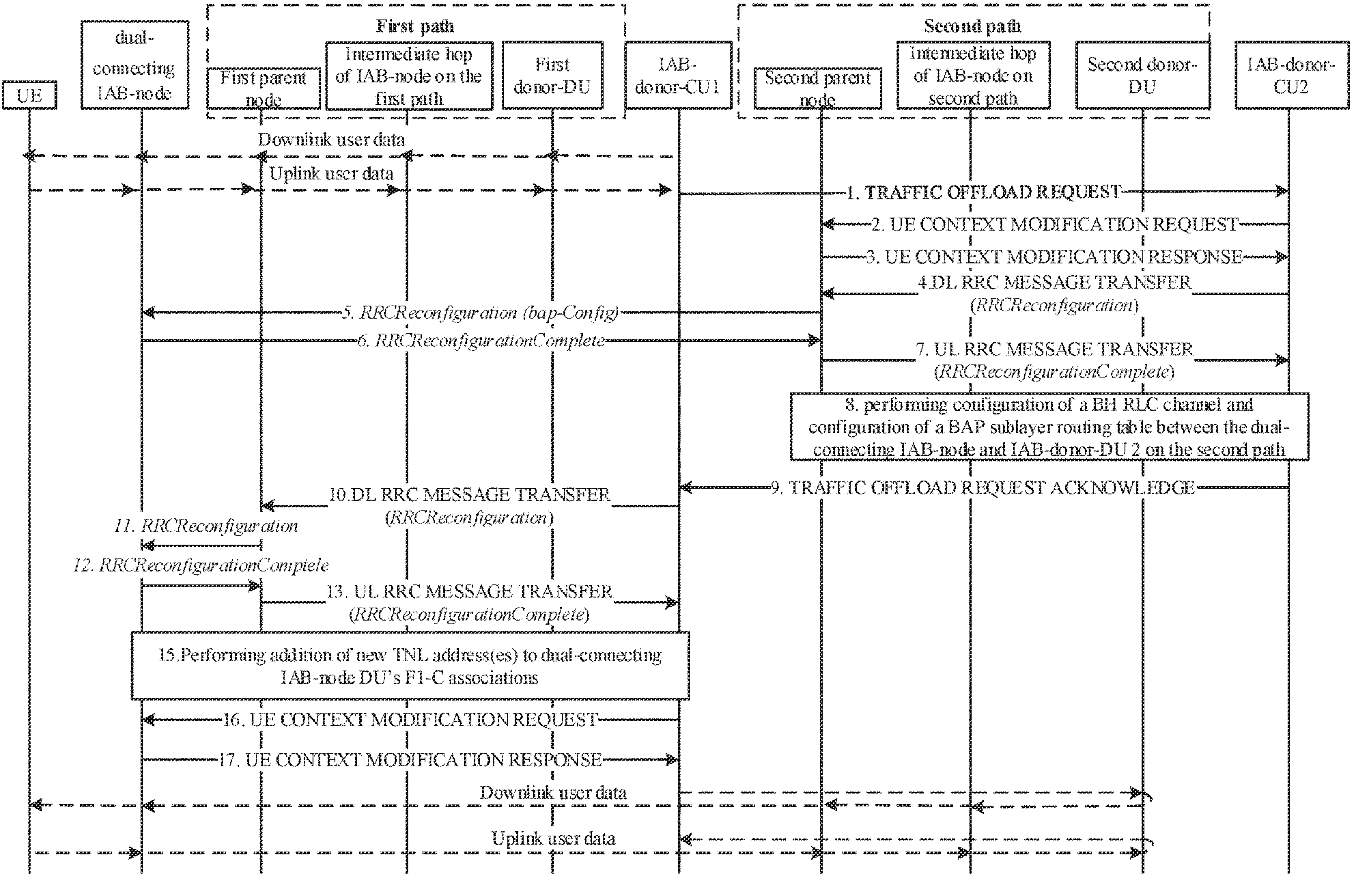
FIG. 5 is a schematic diagram of a procedure of setup of a second path of an IAB-node in Embodiment 1.

FIG. 5 is a schematic diagram of a procedure of setup of the second path of the IAB-node in Embodiment 1. As shown in FIG. 5, the procedure of setup includes the following steps:

1. IAB-donor-CU 1 initiates a traffic offloading request (such as TRAFFIC OFFLOAD REQUEST) to IAB-donor-CU 2, i.e. a request for establishing a redundant path for the dual-connecting IAB-node. If IAB-donor-CU 2 rejects, IAB-donor-CU 2 directly transmits a response of rejection of traffic offloading, and subsequent steps is not executed.

2. If IAB-donor-CU 2 agrees or partially agrees to the traffic offloading request, IAB-donor-CU 2 transmits a UE CONTENT MODIFICATION REQUEST message to the IAB-DU of the second parent node of the dual-connecting IAB-node to modify the UE context of the dual-connecting IAB-MT, and sets one or more bearers.

3. The IAB-DU of the second parent node of the dual-connecting IAB-node transmits a UE CONTENT MODIFICATION RESPONSE message to IAB-donor CU 2.

4. If it is needed to allocate a second BAP address to the dual-connecting IAB-node, IAB-donor CU 2 transmits a downlink radio link control message transfer (such as DL RRC MESSAGE TRANSFER) message to the IAB-DU of the second parent node, the message containing a generated RRCReconfiguration message, the RRCReconfiguration message containing bap-Config, which contains the configured second BAP address.

5. The second parent node forwards the received RRCReconfiguration message to the dual-connecting IAB-MT.

6. The dual-connecting IAB-MT transmits a response with an RRC configuration complete (RRCReconfigurationComplete) message to the second parent node.

7. The second parent node transmits a response with an uplink radio link control transfer (UL RRC MESSAGE TRANSFER) message to IAB-donor-CU 2, the message containing the received RRCReconfigurationComplete message.

8. IAB-donor-CU 2 performs BH RLC channel configuration and BAP sublayer routing entry configuration between the dual-connecting IAB-node and IAB-donor-DU 2 on the second path (configuration of BAP route and mapping rules along the second path between dual-connecting IAB-node and the second path IAB-donor-DU via the second parent IAB-node). Step 8 may be executed earlier, such as being executed directly after step 2.

9. IAB-donor-CU 2 transmits a response with agreement of traffic offloading to IAB-donor-CU 1.

10. IAB-donor-CU 1 transmits a DL RRC MESSAGE TRANSFER message to the IAB-DU of the first parent node according to a content (such as the allocated TNL address) of the response from IAB-donor-CU 2, the message containing the generated RRCReconfiguration message. The RRCReconfiguration message may contain one or more TNL addresses allocated for the dual-connecting IAB-DU, the addresses being anchored at the IAB-donor-DU of the second path (such as donor-DU 2 in FIG. 2). IAB-donor-CU 2 may proactively obtain these TNL addresses from donor-DU 2. When an IPsec channel mode is used to protect F1 and non-F1 traffics, the allocated TNL addresses are outer IP addresses. If a redundant path has been established for F1-C or F1-U of the dual-connecting IAB-node before, the allocated TNL addresses may not need to be allocated any further.

11. The first parent node forwards the received RRCReconfiguration message to the dual-connecting IAB-MT.

12. The dual-connecting IAB-MT transmits a response with an RRCReconfigurationComplete message to the second parent node.

13. The first parent node transmits a UL RRC MESSAGE TRANSFER message to IAB-donor-CU 2, the message conveying the received RRCReconfigurationComplete message.

15. If a new TNL address(es) is/are allocated in step 10, addition of new TNL address(es) to dual-connecting IAB-node DU's F1-C associations is performed. IAB-donor-CU 1 may configure new UL BH information for the F1AP message of the second path, and a specific procedure may be achieved via, for example, a gNB DU configuration update procedure of F1AP.

16. IAB-donor-CU1 migrates the F1-U tunnel between IAB-donor-CU 1 and the dual-connecting IAB-DU from the first path to the second path via a UE CONTEXT MODIFICATION REQUEST message.

17. The dual-connecting IAB-DU transmits a response with CONTEXT MODIFICATION RESPONSE message.

Therefore, the second path of the dual-connecting IAB-node may be established, and uplink user data or downlink user data may be transmitted between the user equipment (UE) and the first IAB-donor-CU via the second path.

For example, as shown in FIG. 5, a transmission order of the uplink user data on the second path is: the UE—the dual-connecting IAB-node—the second parent node—an intermediate hop IAB-node on the second path—the donor-DU on the second path (such as donor-DU 2 in FIG. 2)—the first IAB-donor-CU.

For another example, as shown in FIG. 5, a transmission order of the downstream user data on the second path is as follows: the first IAB-donor-CU—the donor-DU on the second path (such as donor-DU 2 in FIG. 2)—an intermediate hop IAB-node on the second path—the second parent node—the dual-connecting IAB-node—the UE.

In Embodiment 1, a second BAP address is allocated to the dual-connecting IAB-node in steps 4-7. The second BAP address may be used for BAP routing configuration on the redundant path (i.e. the second path). The dual-connecting IAB-node needs to associate the BAP address with a master cell group (MCG)/a secondary cell group (SCG) or an MN/SN. If the RRCReconfiguration message with the BAP address received by the dual-connecting node is from the MCG, or is received via SRB1 (signaling radio bearer 1), the received BAP address is associated with the MCG or the MN; and if the RRCReconfiguration message with the BAP address received by the dual-connecting node is from the SCG, or is received via SRB3, the received BAP address is associated with the SCG or the SN.

Furthermore, the second BAP address may also be allocated in other methods. For example, steps 4-7 may be removed, and the second BAP address may be transmitted along with other RRC configuration messages in steps 10-13. Hence, an existing RRCReconfiguration message format needs to be modified. There are two methods for modification:

method 1: a field is added to the bap-Config IE (information element) of the RRCReconfiguration message, such as being referred to as bap-Address redundant, or bap-Address-second, indicating that the field represents the second BAP address; and method 2: a bap-Address field in the bap-Confg IE of the RRCReconfiguration message is modified into a list, such as being referred to as bap-AddressList. Each entry in this list is a BAP address and its association information, and this entry is, for example, {bap-Address, 'MCG'/' SCG' }, or {bap-Address, iab-donor-DU-BAP-Address}.

Embodiment 2

In Embodiment 2, the IAB-node (such as IAB-node 3 in FIG. 2) is in a state where it is already dual-connected to two different IAB-donor-CUs. Therefore, in Embodiment 2, IAB-node 3 is also referred to as a dual-connecting IAB-node.

Embodiment 2 is used to illustrate a method for establishing an inter-CU redundant path for the descendant node of the IAB-node (such as IAB-node 4 in FIG. 2).

Figure 6:
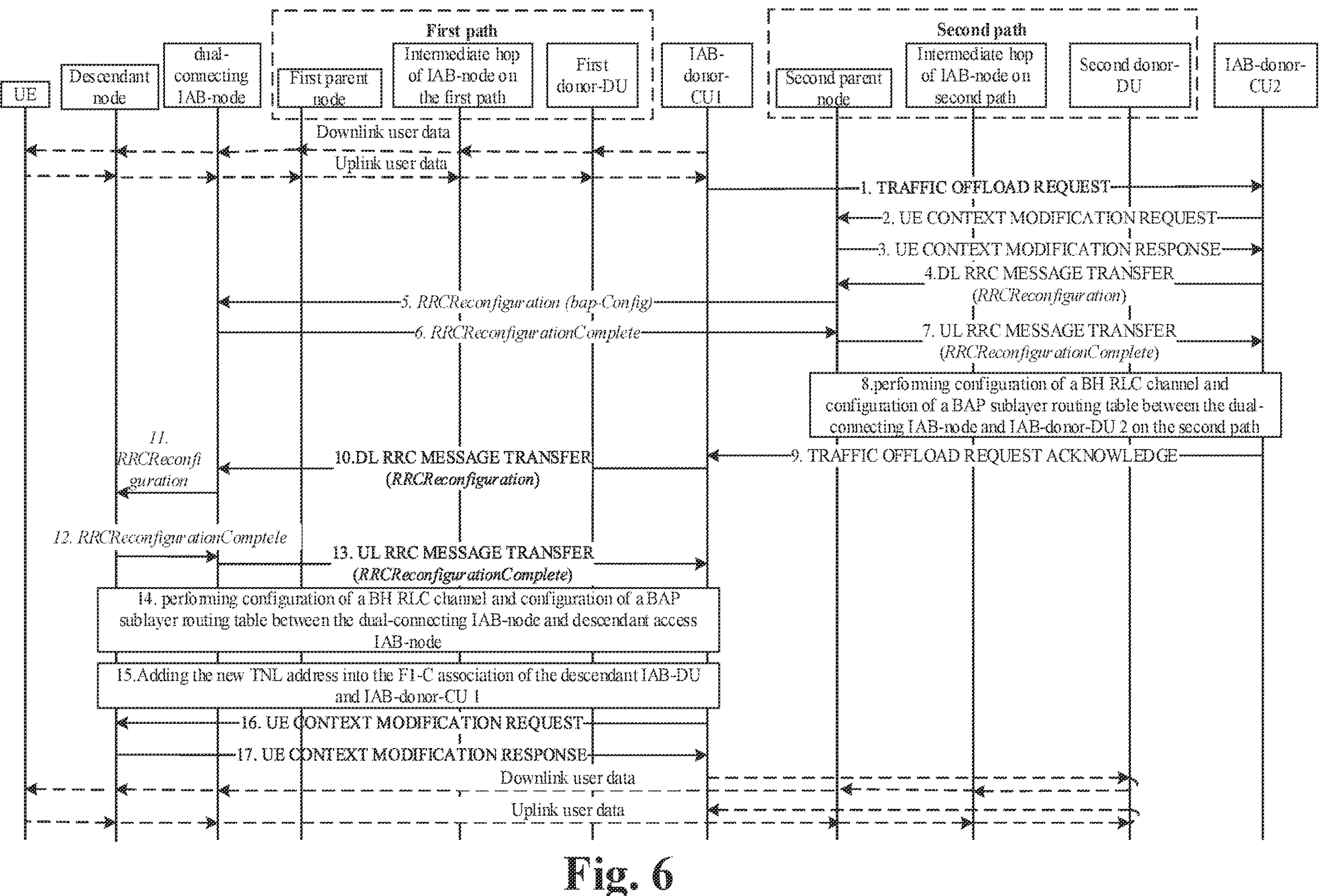
FIG. 6 is a schematic diagram of a method for setting up an inter-CU redundant path for a descendant node of the IAB-node in Embodiment 2.

FIG. 6 is a schematic diagram of a method for setting up an inter-CU redundant path for the descendant node of the IAB-node in Embodiment 2. To simplify the figure, possible nodes between the descendant IAB-node and the dual-connecting IAB-node are not shown. Differences between FIG. 6 and FIG. 5 will be explained below, and reference may be made to the description of Embodiment 1 for identical or similar steps therein.

As shown in FIG. 6, the setup process includes steps as follows:

1. IAB-donor-CU 1 initiates a traffic offloading request to IAB-donor-CU 2, the traffic offloading request including a request for setting up a redundant path for the descendant node of the dual-connecting IAB-node;

4-7. steps 4-7 are identical to steps 4-7 in Embodiment 1, wherein a second BAP address is allocated for the dual-connecting IAB-node when no redundant path is set up for the IAB-node or other descendant IAB-nodes before; and furthermore, if the dual-connecting IAB-node has already been allocated a second BAP address, steps 4-7 may be skipped over and not executed;

8. if necessary, for the descendant nodes on the second path, IAB-donor-CU 2 performs BH RLC channel configuration and BAP sublayer routing entry configuration between the dual-connecting IAB-node and IAB-donor-DU 2, this method being identical to the method for the dual-connecting IAB-node in Embodiment 1.

10. similar to step 10 in FIG. 1, IAB-donor-CU 1 configures one or more TNL addresses for the descendant IAB-node according to the response message from IAB-donor-CU 2, the one or more TNL addresses being anchored at IAB donor-DU 2;

14. IAB-donor-CU 1 performs BH RLC channel configuration and BAP sublayer routing entry configuration between the dual-connecting IAB-node and descendant access IAB-node (configuration of BAP route and mapping rules along the path between dual-connecting IAB-node and the access IAB-node for the redundant path), to support routing and BH RLC channel mapping of the second path; and IAB-donor-CU 1 performs configuration of BAP routing ID mapping on the dual-connecting IAB-node based on the response message from IAB-donor-CU 2 (such as being transmitted in step 9), which is used for BAP routing conversion between two topologies. These configurations may be performed earlier, such as being performed directly after step 10;

15. when a new TNL address is allocated in step 10, the new TNL address is added into the F1-C association of the descendant IAB-DU and IAB-donor-CU 1, and IAB-donor-CU 1 configures new uplink backhaul information (UL BH information) for the F1AP message of the second path;

16. IAB-donor-CU 1 migrates the F1-U tunnel between IAB-donor-CU 1 and the descendant IAB-DU of the dual-connecting IAB-node from the first path to the second path via the UE CONTEXT MODIFICATION REQUEST message; and 17. the descendant IAB-DU transmits a response with UE CONTEXT MODIFICATION RESPONSE message.

Therefore, the second path of the descendant node of the dual-connecting IAB-node may be established, and the uplink user data or downlink user data may be transmitted between the user equipment (UE) and the first IAB-donor-CU via the second path.

For example, as shown in FIG. 6, a transmission order of the uplink user data on the second path is: the UE—the descendant node—the dual-connecting IAB-node—the second parent node—an intermediate hop IAB-node on the second path—the donor-DU on the second path (such as donor-DU 2 in FIG. 2)—the first IAB-donor-CU.

For another example, as shown in FIG. 6, a transmission order of the downstream user data on the second path is as follows: the first IAB-donor-CU—the donor-DU on the second path (such as donor-DU 2 in FIG. 2)—an intermediate hop IAB-node on the second path—the second parent node—the dual-connecting IAB-node—the UE.

Based on different implementations, the process of establishing a redundant path for the descendant IAB-node may be executed after establishing the redundant path for the dual-connecting IAB-node, that is, the process in FIG. 6 may be executed after the process in FIG. 5. Or, the process of establishing a redundant path for the descendant IAB-node may be executed simultaneously with establishing the redundant path for the dual-connecting IAB-node, that is, the process in FIG. 6 may be executed simultaneously with the process in FIG. 5.

Embodiment 3

In Embodiment 3, before the redundant path of the IAB-node is established, the IAB-node (such as IAB-node 3 in FIG. 2) is a single-connecting node, that is, the IAB-node is connected to IAB-donor-CU 1.

When IAB-donor-CU 1 determines that traffics in this topology network are overloaded and network topologies managed by other donor-CUs are needed for traffic offloading, an operation of adding an SN (such as IAB-donor-CU 2 in FIG. 2) is performed on the IAB-node, that is, the IAB-node is made cross-donor (i.e. inter-CU) dual-connected, and some traffics are offloaded to the topology of IAB-donor-CU 2 to establish a redundant path.

Figure 7:
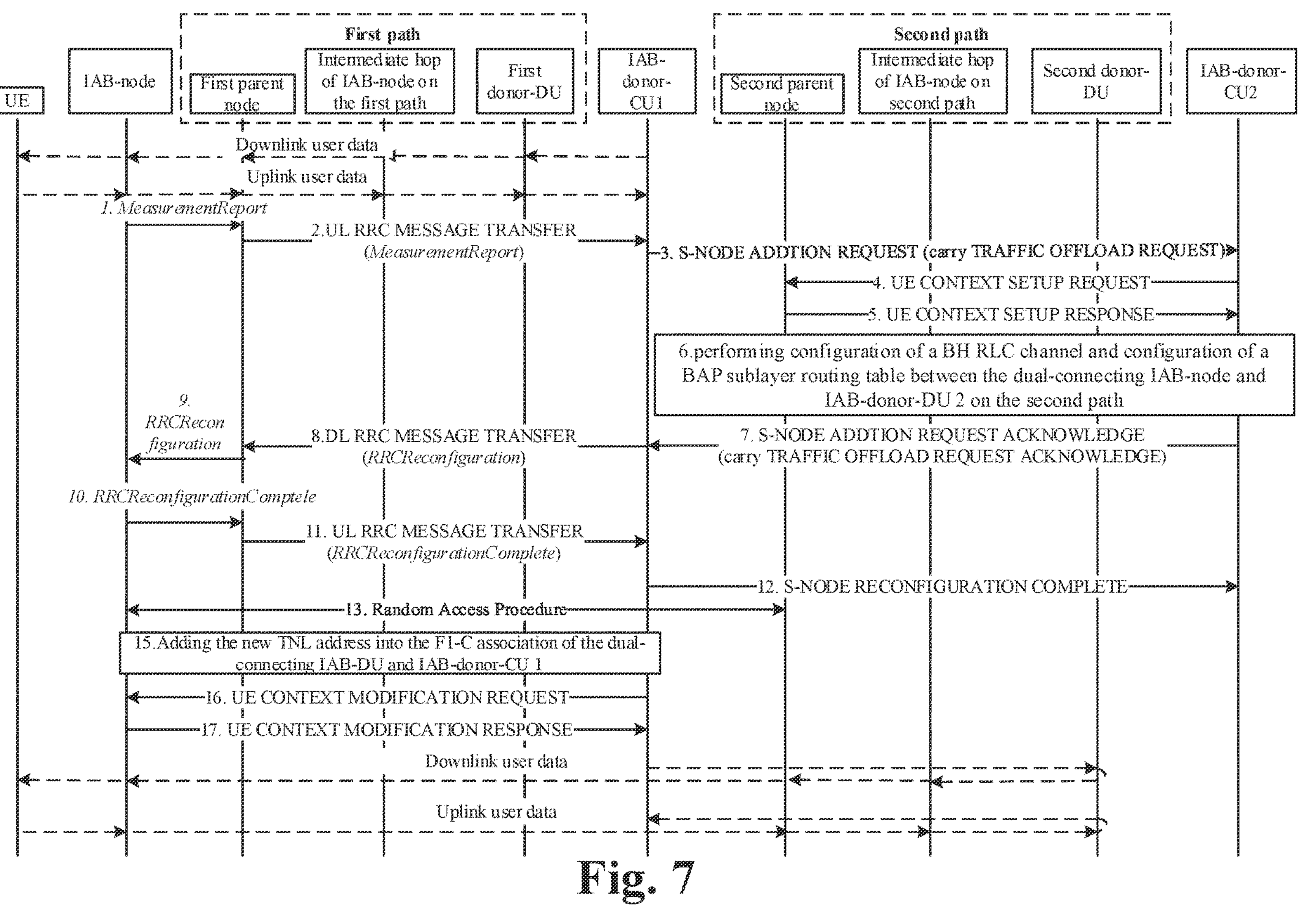
FIG. 7 shows a schematic diagram of adding an SN to the IAB-node to change into a dual-connecting node and setting up a redundant path.

FIG. 7 shows a schematic diagram of adding an SN to the IAB-node to change into a dual-connecting node and setting up a redundant path. To simplify explanations, reference may be made to steps 5-7 of FIG. 5 for a step of allocating a second BAP address by the IAB-node in a dual-connected state, hence, they are not shown in FIG. 7. Main differences between the process shown in FIG. 7 and that in FIG. 5 shall be described below, with identical parts being not going to be repeated any further.

The process in FIG. 7 includes the following steps:

1. the IAB-MT transmits a measurement report (such as MeasurementReport) message to the IAB-DU of the first parent node, the message being generated according to measurement configuration (such as Measurement Configuration) previously received by the IAB-MT from IAB-donor CU 1;
2. the IAB-DU of the first parent node transmits a UL RRC MESSAGE TRANSFER message to IAB-donor-CU 1 to transmit the received MeasurementReport;
3. by IAB-donor CU 1 initiates a request for adding an SN (S-NODE ADDITION REQUEST) message to IAB-donor-CU 2, the message carrying a traffic offloading request, that is, a request for establishing a redundant path for the IAB-node (such as IAB-node 3 in FIG. 2), and reference may be made to Embodiment 4 for specific signaling. If IAB-donor-CU 2 rejects the request for adding an SN, it may transmit a response of rejecting traffic offloading without executing subsequent steps. If IAB-donor-CU 2 agrees to the request for adding an SN but rejects the traffic offloading request, it performs a process of adding an SN directly according to existing standards. The response message contains contents of rejecting traffic offloading, and these subsequent steps need not to be executed;
4. if IAB-donor-CU 2 agrees or partially agrees to the traffic offloading request, IAB-donor-CU 2 transmits a UE CONTENT SETUP REQUEST message to the IAB-DU of the second parent node of the IAB-node to set up a UE context of the IAB-MT and set one or more bearers, the one or more bearers being used for signaling of the IAB-MT of its own, and optional data traffics.

5. the IAB-DU of the second parent node of the IAB-node transmits a response of a UE CONTENT SETUP RESPONSE message to IAB-donor CU 2.

7. by IAB-donor-CU 2 transmits a response of a SN addition request acknowledge (S-NODE ADDION REQUEST ACKNOWLEDGE) message to IAB-donor-CU 1, the message containing IE agreeing to traffic offloading.

12. IAB-donor-CU 1 transmits a secondary node reconfiguration complete (such as S-NODE RECONFIGURATION COMPLETE) message to IAB-donor-CU 2, the message indicating that dual-connecting configuration of the IAB-node has been successfully completed; and 13. the IAB-node performs a random access procedure on the IAB-DU of the second parent node.

Description of other steps in FIG. 7 is identical to those in Embodiment 1. In addition, in FIG. 7, if the message in step 3 further includes a request for establish a redundant path for the descendant IAB-node, corresponding operations may be performed according to Embodiment 2.

Embodiment 4 Embodiment 4 describes signaling between IAB-donor-CU 1 and IAB-donor-CU 2, that is, an XnAP (Xn Application Protocol) procedure. IAB-donor-CU 1 transmits a traffic offloading request to IAB-donor-CU 2, the request being used to migrate an F1-C or one or more F1-U tunnels to a topology redundant path of IAB-donor-CU 2.

For embodiments 1 and 2, a new dual-connecting-related XnAP procedure (such as a traffic offloading procedure) and a new XnAP message may be added.

Figure 8:
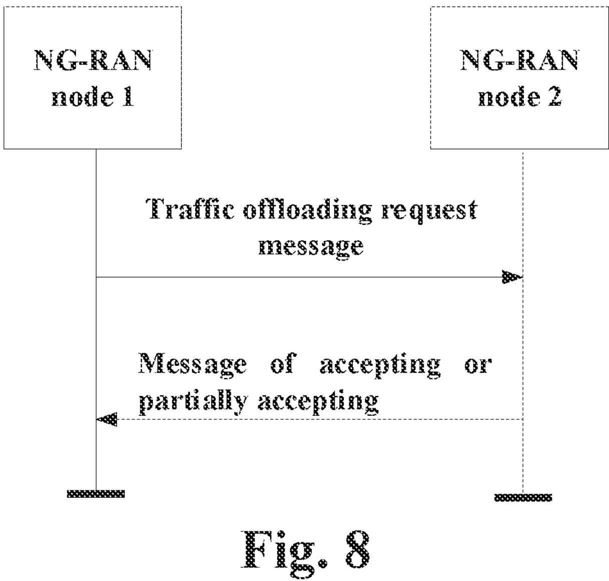
FIG. 8 is a schematic diagram of success of a traffic offloading procedure.

FIG. 8 is a schematic diagram of success of a traffic offloading procedure. As shown in FIG. 8, NG-RAN node 1 (i.e. IAB-donor-CU 1) transmits a traffic offloading request message, such as being referred to as a TRAFFIC OFFLOAD REQUEST message, to NG-RAN node 2 (i.e. IAB-donor-CU 2). NG-RAN node 2 transmits a response of message of accepting or partially accepting, such as being referred to as a TRAFFIC OFFLOAD REQUEST ACKNOWLEDGE message. The partially accepting refers to establishing redundant paths for F1-Cs with which some TNLs are associated, or establishing redundant paths for some F1-U tunnels.

Figure 9:
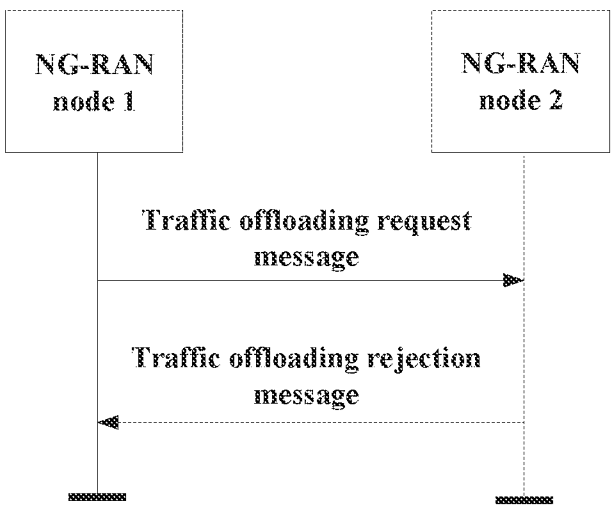
FIG. 9 is a schematic diagram of failure of a traffic offloading procedure.

FIG. 9 is a schematic diagram of failure of a traffic offloading procedure. As shown in FIG. 9, NG-RAN node 1 (i.e. IAB-donor-CU 1) transmits a traffic offloading request message, such as a TRAFFIC OFFLOAD REQUEST message, to NG-RAN node 2 (i.e. IAB-donor-CU 2). If NG-RAN node 2 has a relatively high traffic load or other failures occur, all traffic offloading requests may be rejected, hence, no redundant path is established. This traffic offloading rejection message may be referred to as a TRAFFIC OFFLOAD REQUEST REJECT message, which may contain a reason for failure.

The traffic offloading request message may include the UE XnAP ID of the traffic offloading initiating node, and/or identification information of one or more F1-Cs, thereby establishing redundant paths for one or more access IAB-nodes. These access IAB-nodes may be dual-connecting IAB-nodes or IAB-nodes that are about to be dual-connecting IAB-nodes, or may be descendant IAB-nodes of dual-connecting IAB-nodes. The traffic offloading request message may further include the BAP address of the access IAB-node. The F1-C identification information may be a TNL association, or may be TNL-associated transport layer information (such as an IAB-DU control plane transport layer address, i.e. a TNL address). Traffic offloading of F1-C may be explicitly performed on the TNL association, or performing traffic offloading of F1-C on the TNL association may be implicitly indicated by not providing information on F1-U.

If a traffic offloading request for F1-C is accepted, the Traffic Offload Request Acknowledge message may include the UE XnAP ID of the traffic offloading initiating node, the UE XnAP ID of the traffic offloading accepting node, the identification information of the F1-C, a TNL address newly allocated by IAB-donor-DU 2 for the access IAB-DU, a BH RLC channel ID configured for the F1-C on the link between the dual-connecting IAB-node and the second parent node, the BAP address of the second parent node, a BAP routing identifier (including uplink and downlink) in the topology controlled by CU 2, and a possible second BAP address of the dual-connecting IAB-node, etc. The BAP address of the second parent node is used by a next hop of node in configuring uplink routing of a redundant path when donor-CU 1 configures a routing entry for the dual-connecting IAB-node. The BAP routing identifier in the topology controlled by donor-CU 2 refers to an uplink or downlink BAP routing identifier between donor-DU 2 and the dual-connecting IAB-node, and is used by donor-CU 1 in configuring BAP routing identification mapping for the dual-connecting IAB-node.

The traffic offloading request message may further include one or more F1-U tunnels, i.e. identification information of data radio bearers (DRBs), indicating establishing redundant paths for these F1-U tunnels. The F1-U tunnel identification information may be user plane (UP) transport layer information, which includes a transport layer address and GTP-TEID (GPRS tunnelling protocol-tunnel endpoint ID). The request message may further include a BAP address and TNL address of the access IAB-node, IP header information of the F1-U, and QoS information, etc. The IP header information is used for donor-DU 2 to perform traffic mapping from the IP layer to layer 2, and the QoS information is used to perform BH RLC channel selection and configuration hops of the redundant path. The QoS information may be the DRB QoS IE defined in TR38.473, or may be a part of information in an IE, such as a 5QI (5G QoS identifier). If the traffic offloading request for the F1-U tunnel is accepted or partially accepted, the traffic offload request acknowledge message may include identification information of the received F1-U tunnel and a BH RLC channel identifier on the link between the dual-connecting IAB-node and the second parent node configured for the F1-U tunnel, and may further include a new TNL address, the BAP address of the second parent node, the BAP routing identifier in the topology controlled by CU 2 (including uplink and downlink), and a possible second BAP address of the dual-connecting IAB-node, etc.

In a case where there exists dual-connectivity and an MN initiates a traffic offloading request, contents of these requests and response messages may further be taken as IEs and contained in an S-NG-RAN node modification preparation procedure of an existing XnAP, that is, existing messages, such as S-NODE MODIFICATION REQUEST, S-NODE MODIFICATION REQUEST ACKNOWLEDGE, S-NODE MODIFICATION REJECT, etc., are reused. When the existing messages are reused, if all traffic offloading requests are rejected but any other modification requests are agreed, the S-NODE MODIFICATION REQUEST ACKNOWLEDGE message is still used. The S-NODE MODIFICATION REJECT message is used only when any modification request is disagreed and any traffic offloading request is disagreed, or if a failure occurs.

If it is in Embodiment 3, the contents of these messages may be taken as IEs and contained in the S-NG-RAN node addition preparation process of the existing XnAP. That is, existing messages, such as S-NODE ADDION REQUEST, S-NODE ADDION REQUEST ACKNOWLEDGE, S-NODE ADDION PROJECT, etc., are reused. When the existing messages are reused, if all traffic offloading requests are rejected but the SN addition request is agreed, the S-NODE MODIFICATION REQUEST ACKNOWLEDGE message is still used. The S-NODE MODIFICATION REJECT message is used only when the SN addition request is disagreed, or a failure occurs.

Embodiment 5

Embodiment 5 is used to describe a process of releasing a redundant path between IAB-donor-CU 1 and IAB-donor-CU 2.

Both NG-RAN node 1 (i.e. IAB-donor-CU 1) and NG-RAN node 2 (i.e. IAB-donor-CU 2) may initiate the process of releasing a redundant path. A new dual-connecting-related XnAP process may be added to carry out the process of releasing.

Figure 10:
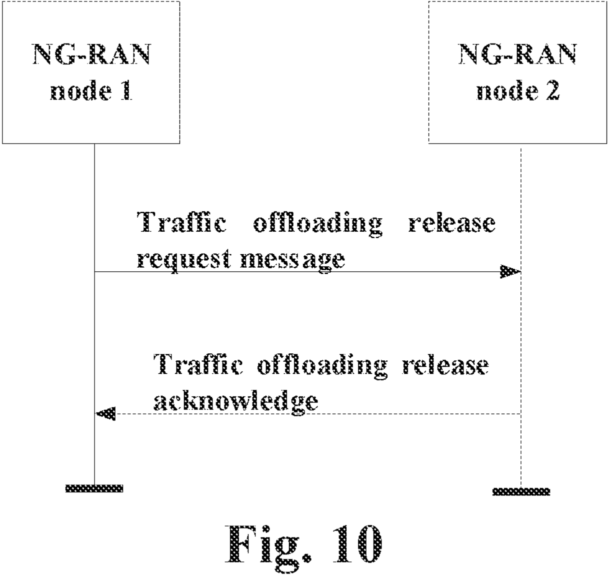
FIG. 10 is a schematic diagram of proposing redundant path release by an initiator of traffic offloading.

Both an initiator of traffic offloading (such as IAB-donor-CU 1) and a receptor (such as IAB-donor-CU 2) may propose release of redundant paths. FIG. 10 is a schematic diagram of proposing redundant path release by an initiator of traffic offloading, and FIG. 11 is a schematic diagram of proposing redundant path release by a receptor of traffic offloading.

Figure 11:
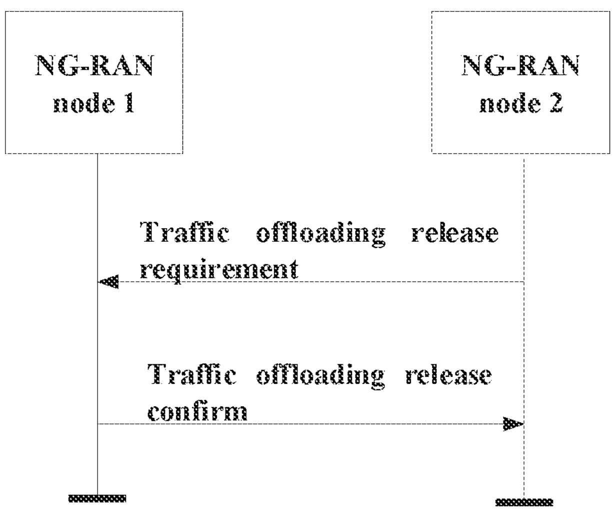
FIG. 11 is a schematic diagram of proposing redundant path release by a receptor of traffic offloading.

As shown in FIGS. 10 and 11, different message names may be used to distinguish whether the redundant path release is proposed by the initiator of traffic offloading (such as IAB-donor-CU 1) or the receptor (such as IAB-donor-CU 2). For example, as shown in FIG. 10, the initiator of traffic offloading, i.e. the F1 terminating donor-node, may transmit a traffic offload release request message to a non-F1-terminating donor-node, and the non-F1-terminating donor-node transmits a response of traffic offload release acknowledge message; and as shown in FIG. 11, the non-F1-terminating donor-node may transmit a traffic offload release required message to the F1 terminating donor-node, and the F1 terminating donor-node transmits a response of traffic offload release confirm message.

The traffic offload release request/required messages contain a TNL address with which an F1-C needing redundant path release is associated, or UP transport layer information of an F1-U tunnel needing redundant path release.

The specific process of releasing redundant paths is: if necessary, releasing a BAP routing entry related to a redundant path by donor-CU 1 and/or donor-CU 2, modifying or releasing a BH RLC channel needed by the redundant path; and if necessary, deleting mapping information of a relevant BAP routing identifier on the dual-connecting IAB-node by donor-CU 1.

If an MN initiates the process of releasing redundant paths, the above request and response messages may further be taken as IEs and contained in the S-NG-RAN node modification preparation procedure of the existing XnAP, that is, reusing existing messages, such as S-NODE MODIFICATION REQUEST, S-NODE MODIFICATION REQUEST ACKNOWLEDGE, etc.

In the process of S-NG-RAN node release, all redundant paths in the SN topology are released.

Embodiment of a Third Aspect

At least addressed to the same problem as the embodiment of the first aspect, the embodiment of the third aspect of this disclosure provides a method for transmitting and receiving a signal, corresponding to the method of the embodiment of the first aspect. The method for transmitting and receiving a signal of the embodiment of the third aspect is applicable to an IAB-node, wherein the IAB-node may be, for example, IAB-node 3 in FIG. 2.

Figure 12:
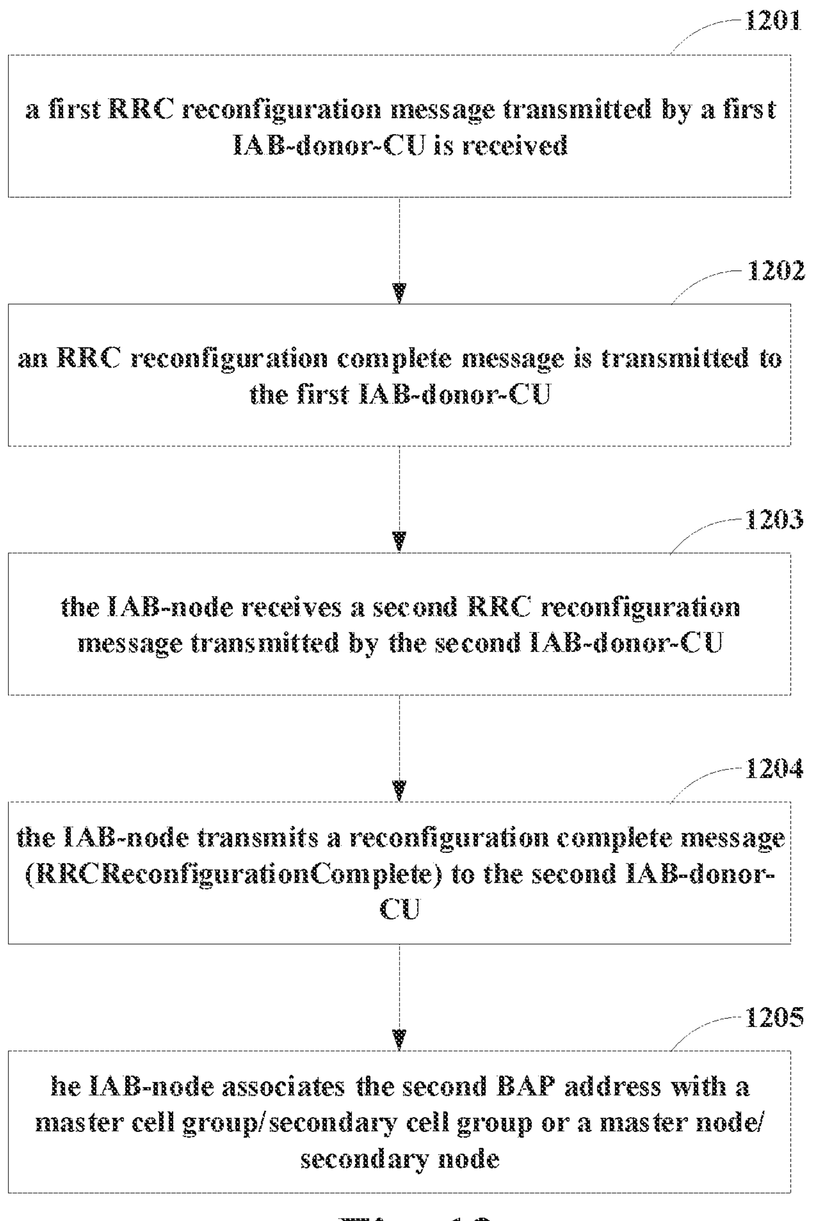
FIG. 12 is a schematic diagram of the method for transmitting and receiving a signal of an embodiment of a third aspect.

FIG. 12 is a schematic diagram of the method for transmitting and receiving a signal of the embodiment of the third aspect. As shown in FIG. 12, the method includes:

operation 1201: a first RRC reconfiguration message transmitted by a first IAB-donor-CU is received; and operation 1202: an RRC reconfiguration complete message is transmitted to the first IAB-donor-CU, wherein the first RRC reconfiguration message is generated according to a response of agreement of traffic offloading transmitted by a second IAB-donor-CU to the first IAB-donor-CU, and the first RRC reconfiguration message includes at least one TNL address allocated for a DU of the IAB-node, the TNL address being anchored to a second IAB-donor-DU in topology of the second IAB-donor-CU.

A bap configuration information element (bap-Config IE) of the first RRC reconfiguration message includes a field for indicating a second BAP address configured for the IAB-node; or, a bap address field in a bap configuration information element (bap-Config IE) of the first RRC reconfiguration message includes a list, each entry in the list being a BAP address and its associated information.

The RRC reconfiguration complete (such as RRCReconfigurationComplete) message in operation 1202 is used to indicate that the IAB-node has received the first RRC reconfiguration message. In addition, the RRC reconfiguration completion message may further indicate that the IAB-node has completed reconfiguration.

According to operation 1201 and operation 1202, a cross-donor redundant path may be established for the IAB-node.

As shown in FIG. 12, the method further includes:

operation 1203: the IAB-node receives a second RRC reconfiguration message transmitted by the second IAB-donor-CU; and operation 1204: the IAB-node transmits a reconfiguration complete message to the second IAB-donor-CU.

In operation 1203, the second RRC reconfiguration message includes BAP configuration information (bap-Config), the BAP configuration information including a second BAP address configured for the IAB-node. And in operation 1204, the reconfiguration complete (RRCReconfigurationComplete) message is used to indicate that the IAB-node has received the second RRC Reconfiguration message.

As shown in FIG. 12, the method further includes:

operation 1205: the IAB-node associates the second BAP address with a master cell group (MCG)/secondary cell group (SCG) or a master node (MN)/secondary node (SN).

For example, if the second RRCReconfiguration message carrying the second BAP address received by the IAB-node is from the MCG or is received via a signaling radio bearer (SRB) 1, the second BAP address is associated with the MCG or the MN; and if the second RRCReconfiguration message carrying the second BAP address received by the IAB-node is from the SCG or is received via SRB3, the second BAP address is associated with the SCG or the SN.

Embodiment of a Fourth Aspect

At least addressed to the same problem as the embodiment of the first aspect, the embodiment of the fourth aspect of this disclosure provides a method for transmitting and receiving a signal, corresponding to the method of the embodiment of the first aspect. The method for transmitting and receiving a signal of the embodiment of the fourth aspect is applicable to a descendant node of an IAB-node, wherein the descendant node may be, for example, IAB-node 4 in FIG. 2.

Figure 13:
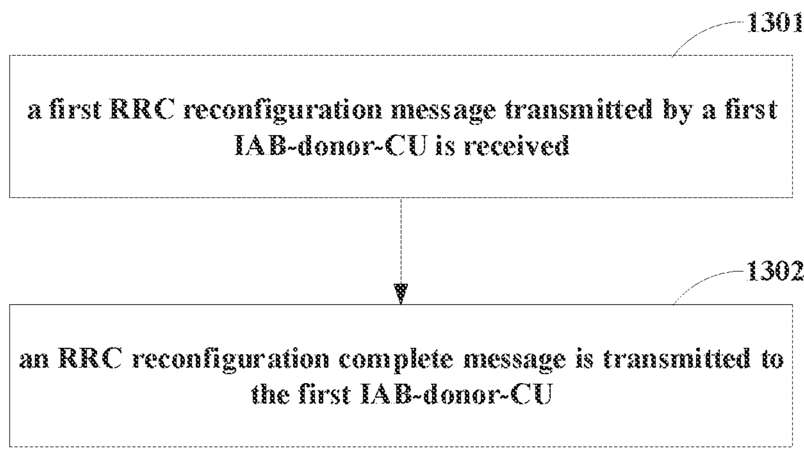
FIG. 13 is a schematic diagram of the method for transmitting and receiving a signal of the embodiment of the third aspect.

FIG. 13 is a schematic diagram of the method for transmitting and receiving a signal of the embodiment of the third aspect. As shown in FIG. 13, the method includes:

- operation 1301: a first RRC reconfiguration message transmitted by a first IAB-donor-CU is received; and
- operation 1302: an RRC reconfiguration complete message is transmitted to the first IAB-donor-CU,
- wherein the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the descendant node, the TNL address being anchored to a second IAB-donor-DU in topology of the second IAB-donor-CU;
- and wherein the RRC reconfiguration complete (RRCReconfigurationComplete) message in operation 1302 is used to indicate that the descendant node has received the first RRC reconfiguration message. In addition, the RRC reconfiguration completion message may further indicate that the descendant node has completed reconfiguration.

According to the embodiment of the fourth aspect, a cross-donor redundant path may be established for the descendant node of the IAB-node.

Embodiment of a Fifth Aspect

The embodiment of this disclosure provides an apparatus for transmitting and receiving a signal, applicable to a first IAB-donor-CU. The apparatus may be a first IAB-donor-CU, or may be a part of units of the first IAB-donor-CU. The apparatus corresponds to the method of the embodiment of the first aspect.

Figure 14:
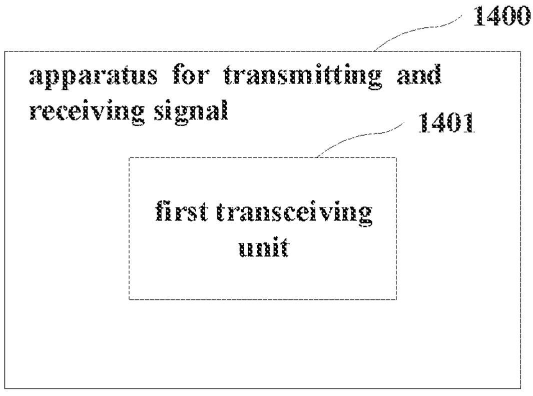
FIG. 14 is a schematic diagram of the apparatus for transmitting and receiving a signal of an embodiment of this disclosure.

FIG. 14 is a schematic diagram of the apparatus for transmitting and receiving a signal of the embodiment of this disclosure. As shown in FIG. 14, an apparatus 1400 for transmitting and receiving a signal includes a first transceiving unit 1401, the first transceiving unit 1401 being configured to:

- transmit a traffic offloading request to a second IAB-donor-CU; and
- receive a response of agreement of traffic offloading or a response of rejection of traffic offloading transmitted by the second IAB-donor-CU.

In at least one embodiment, the first transceiving unit 1401 is further configured to: transmit a first RRC reconfiguration message to an IAB-node and/or a descendant IAB-node of the IAB-node according to the response of agreement of traffic offloading,

- wherein the first RRC reconfiguration message includes at least one TNL address allocated respectively for a DU of the IAB-node and/or that of the descendant node of the IAB-node, the TNL address being anchored to a second IAB-donor-DU in topology of the second IAB-donor-CU, the IAB-node is connected to a first parent node, the first parent node being a node in the topology of the first IAB-donor-CU, and the IAB-node is already or is to be connected to a second parent node, the second parent node being a node in the topology of the second IAB-donor-CU.

In at least one embodiment, a BAP configuration information element (bap-Config IE) of the first RRC reconfiguration message includes a field used for indicating a second BAP address configured for the IAB-node; or a BAP address field in the BAP configuration information element (bap-Config IE) of the first RRC reconfiguration message includes a list, each entry in the list being a BAP address and its associated information.

In at least one embodiment, the first transceiving unit is further configured to:

- in a case where a new TNL address is allocated, add the new TNL address to the F1-C association between the DU of the IAB-node and/or that of its descendant node and the first IAB-donor-CU.

In at least one embodiment, the traffic offloading request includes a request for setting up redundant paths for the IAB-node and/or a descendant node of the IAB-node.

In at least one embodiment, the first transceiving unit 1401 is further configured to: perform, by the first IAB-donor-CU, configuration of a BH RLC channel and configuration of a BAP sublayer routing entry between the IAB-node and the descendant node of the IAB-node, to support routing and BH RLC channel mapping of the second path.

In at least one embodiment, the first transceiving unit 1401 is further configured to:

- perform, by the first IAB-donor-CU, configuration of BAP routing ID mapping on the IAB-node according to the response of agreement of traffic offloading.

In at least one embodiment, the first transceiving unit 1401 is further configured to:

- migrate an F1-U tunnel between the first IAB-donor-CU and the DU of the IAB-node and/or the descendant node of the IAB-node by the first IAB-donor-CU from the first path to the second path via a UE CONTEXT MODIFICATION REQUEST message or a UE CONTEXT SETUP REQUEST message.

In at least one embodiment, the response of agreement of traffic offloading indicates that the traffic offloading request is at least partially accepted, wherein that the traffic offloading request is at least partially accepted refers to that redundant paths are set up for some TNL-associated F1-Cs or for some F1-U tunnels.

In at least one embodiment, the IAB-node is connected to a first parent node, and the IAB-node is connected to a second parent node, the first parent node being a node in the topology of the first IAB-donor-CU, and the second parent node being a node in the topology of the second IAB-donor-CU. The traffic offloading request is contained in a traffic offloading request message, the response of agreement of traffic offloading is contained in a traffic offloading request acknowledge message, and the response of rejection of traffic offloading is contained in a traffic offloading request reject message.

In at least one embodiment, the traffic offloading request message includes an identifier of a user equipment of a traffic offloading initiating node at an Xn interface (UE XnAP ID), and/or one or more pieces of F1-C identification information, the F1-C identification information being used for establishing redundant paths for one or more F1-Cs of the access IAB-node, the access IAB-node including the IAB-node and/or the descendant node of the IAB-node or an IAB-node that is about to be a dual-connecting node.

In at least one embodiment, the traffic offloading request message includes at least one of the following:

a UE XnAP ID of the traffic offloading initiating node, a BAP address of the access IAB-node, a TNL address, one or more pieces of F1-C identification information, IP header information of an F1-C and/or F1-U tunnels, or QoS information of the F1-U tunnels.

In at least one embodiment, in a case where a traffic offloading request for an F1-C and/or F1-U tunnel is accepted, the traffic offloading request acknowledge message includes at least one of the following:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, or a second BAP address of the IAB-node.

In at least one embodiment, in a case where traffic offloading requests for all F1-Cs and F1-U tunnels are rejected, the traffic offloading request reject message includes a UE XnAP ID of the traffic offloading initiating node.

In at least one embodiment, the IAB-node is connected to the first parent node, and the IAB-node is connected to the second parent node, the first parent node being a node in the topology of the first IAB-donor-CU, and the second parent node being a node in the topology of the second IAB-donor-CU, the first IAB-donor-CU is a master node (MN), and contents of the traffic offloading request and contents of the response of agreement of traffic offloading or contents of the response of rejection of traffic offloading are taken as information elements (IEs) and contained in messages of an S-NG-RAN node modification preparation procedure of an XnAP.

In at least one embodiment, the IAB-node is connected to the first parent node, and the IAB-node is not connected to the second parent node, the first parent node being a node in the topology of the first IAB-donor-CU, and the second parent node being a node in the topology of the second IAB-donor-CU, and contents of the traffic offloading request and contents of the response of agreement of traffic offloading or contents of the response of rejection of traffic offloading are taken as information elements (IEs) and contained in a message of an S-NG-RAN node addition preparation process of an XnAP.

In at least one embodiment, the traffic offloading request is included in a secondary node addition request (S-NODE ADDITION REQUEST) message transmitted by the first IAB-donor-CU to the second IAB-donor-CU.

In at least one embodiment, the response of agreement of traffic offloading is included in a secondary node addition request acknowledge (S-NODE ADDITION REQUEST ACKNOWLEDGE) message transmitted by the second IAB-donor-CU to the first IAB-donor-CU.

In at least one embodiment, the response of rejection of traffic offloading is included in an S-NODE ADDITION REQUEST ACKNOWLEDGE message transmitted by the second IAB-donor-CU to the first IAB-donor-CU.

In at least one embodiment, the first transceiving unit 1401 is further configured to:

transmit or receive a redundant path release request by the first IAB-donor-CU; and receive or transmit a redundant path release request acceptance message by the first IAB-donor-CU.

In at least one embodiment, the redundant path release request includes a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path.

In at least one embodiment, the redundant path release request includes a UE XnAP ID of the traffic offloading initiating node, and a UE XnAP ID of a traffic offloading accepting node.

In at least one embodiment, in a case where MNs in the first IAB-donor-CU and the second IAB-donor-CU transmit redundant path release requests, contents of the redundant path release request and contents of the redundant path release request acceptance message are taken as IEs and contained in the S-NG-RAN node modification preparation process.

In at least one embodiment, in performing a secondary base station node release (S-NG-RAN node Release) process of the IAB-node, all redundant paths related to the IAB-node in the SN topology are released.

Reference may be made to the description of the method in the embodiment of the first aspect for detailed description of the first transceiving unit 1401.

Embodiment of a Sixth Aspect

The embodiment of this disclosure provides an apparatus for transmitting and receiving a signal, applicable to a second IAB-donor-CU. The apparatus may be a second IAB-donor-CU, or may be one or more components or assemblies configured in the second IAB-donor-CU. The apparatus corresponds to the method of the embodiment of the second aspect.

Figure 15:
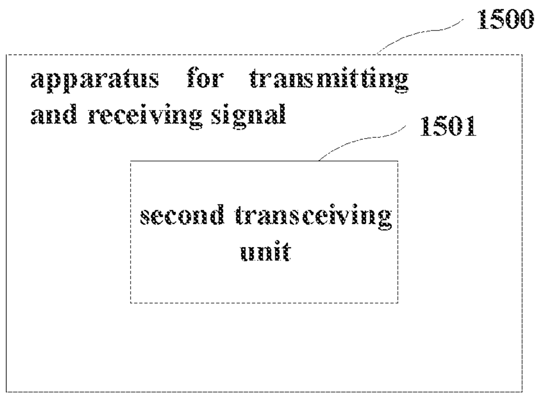
FIG. 15 is a schematic diagram of the apparatus for transmitting and receiving a signal of an embodiment of a sixth aspect.

FIG. 15 is a schematic diagram of the apparatus for transmitting and receiving a signal of the embodiment of the sixth aspect. As shown in FIG. 15, an apparatus 1500 for transmitting and receiving a signal includes a second transceiving unit 1501, the second transceiving unit 1501 being configured to:

receive a traffic offloading request transmitted by a first IAB-donor-CU; and transmit a response of agreement of traffic offloading or a response of rejection of traffic offloading to the first IAB-donor-CU.

In at least one embodiment, the traffic offloading request includes a request for setting up a redundant path for an IAB-node and/or a descendant node of the IAB-node.

In at least one embodiment, the second transceiving unit 1501 is further configured to:

when the IAB-node is already connected to a second parent node, transmit, by the second IAB-donor-CU, a UE context modification request message to the second parent node to modify a user equipment (UE) context of a mobile terminal (MT) of the IAB-node, and set at least one bearer, wherein the second parent node is a node in topology of the second IAB-donor-CU.

In at least one embodiment, the second transceiving unit 1501 is further configured to:

when the IAB-node is not connected to the second parent node, transmit, by the second IAB-donor-CU, a UE context setup request message to the second parent node to set up a UE context of an MT of the IAB, and set at least one bearer, wherein the second parent node is a node in topology of the second IAB-donor-CU.

In at least one embodiment, the second transceiving unit 1501 is further configured to:

transmit, by the second IAB-donor-CU, a second reconfiguration (RRCReconfiguration) message to the mobile terminal (MT) of the IAB-node, the second RRCReconfiguration message including BAP configuration information (bap-Config), the BAP configuration information including an address of a second BAP configured for the IAB-node.

In at least one embodiment, the second transceiving unit 1501 is further configured to:

for a second path required by the IAB-node and/or the descendant node of the IAB-node, perform configuration of a BH RLC channel and configuration of a routing entry of a BAP sublayer by the second IAB-donor-CU between the IAB-node and a second IAB-donor-DU, the second IAB-donor-DU being in the topology of the second IAB-donor-CU.

In at least one embodiment, the response of agreement of traffic offloading indicates that the traffic offloading request is at least partially accepted, wherein that the traffic offloading request is at least partially accepted refers to that redundant paths are set up for some TNL-associated F1-Cs or for some F1-U tunnels.

In at least one embodiment, the IAB-node is connected to a first parent node, and the IAB-node is connected to a second parent node, the first parent node being a node in the topology of the first IAB-donor-CU, and the second parent node being a node in the topology of the second IAB-donor-CU, and the traffic offloading request is included in a traffic offloading request message, the response of agreement of traffic offloading is included in a traffic offloading request acknowledge message, and the response of rejection of traffic offloading is included in a traffic offloading request reject message.

In at least one embodiment, the traffic offloading request message includes an identifier of a user equipment of a traffic offloading initiating node at an Xn interface (UE XnAP ID), and/or one or more pieces of F1-C identification information, the F1-C identification information being used for establishing redundant paths for one or more F1-Cs of the access IAB-node, the access IAB-node including the IAB-node and/or the descendant node of the IAB-node or an IAB-node that is about to be a dual-connecting node.

In at least one embodiment, the traffic offloading request message includes at least one of the following:

a UE XnAP ID of the traffic offloading initiating node, a BAP address of the access IAB-node, a TNL address, one or more pieces of F1-C identification information, IP header information of an F1-C and/or F1-U tunnels, or QoS information of the F1-U tunnels.

In at least one embodiment, in a case where a traffic offloading request for an F1-C and/or F1-U tunnel is accepted, the traffic offloading request acknowledge message includes at least one of the following:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, or a second BAP address of the IAB-node.

In at least one embodiment, in a case where traffic offloading requests for all F1-Cs and F1-U tunnels are rejected, the traffic offloading request reject message includes a UE XnAP ID of the traffic offloading initiating node, and may optionally include a UE XnAP ID of the traffic offloading rejecting node.

In at least one embodiment, the IAB-node is connected to the first parent node, and the IAB-node is connected to the second parent node, the first parent node being a node in the topology of the first IAB-donor-CU, and the second parent node being a node in the topology of the second IAB-donor-CU, the first IAB-donor-CU is a master node (MN), and contents of the traffic offloading request and contents of the response of agreement of traffic offloading or contents of the response of rejection of traffic offloading are taken as information elements (IEs) and contained in messages of an S-NG-RAN node modification preparation process of an XnAP.

In at least one embodiment, the IAB-node is connected to the first parent node, and the IAB-node is not connected to the second parent node, the first parent node being a node in the topology of the first IAB-donor-CU, and the second parent node being a node in the topology of the second IAB-donor-CU, and contents of the traffic offloading request and contents of the response of agreement of traffic offloading or contents of the response of rejection of traffic offloading are taken as information elements (IEs) and contained in a message of an S-NG-RAN node addition preparation process of an XnAP.

In at least one embodiment, the traffic offloading request is included in a secondary node addition request (S-NODE ADDITION REQUEST) message transmitted by the first IAB-donor-CU to the second IAB-donor-CU.

In at least one embodiment, the response of agreement of traffic offloading is included in a secondary node addition request acknowledge (S-NODE ADDITION REQUEST ACKNOWLEDGE) message transmitted by the second IAB-donor-CU to the first IAB-donor-CU.

In at least one embodiment, the second transceiving unit 1501 is further configured to:

receive or transmit a redundant path release request by the second IAB-donor-CU; and transmit or receive a redundant path release request acceptance message by the second IAB-donor-CU.

In at least one embodiment, the redundant path release request includes a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path.

In at least one embodiment, in a case where MNs in the first IAB-donor-CU and the second IAB-donor-CU transmit redundant path release requests, contents of the redundant path release request and contents of the redundant path release request acceptance message are taken as IEs and contained in the S-NG-RAN node modification preparation process.

In at least one embodiment, in performing a secondary base station node release (S-NG-RAN node Release) process of the IAB-node, all redundant paths related to the IAB-node in the SN topology are released.

Reference may be made to the description of the method in the embodiment of the second aspect for detailed description of the second transceiving unit 1501.

Embodiment of a Seventh Aspect

The embodiment of this disclosure provides an apparatus for transmitting and receiving a signal, applicable to an IAB-node. The apparatus may be an IAB-node, or may be one or more components or assemblies configured in the IAB-node. The apparatus corresponds to the method of the embodiment of the third aspect.

Figure 16:
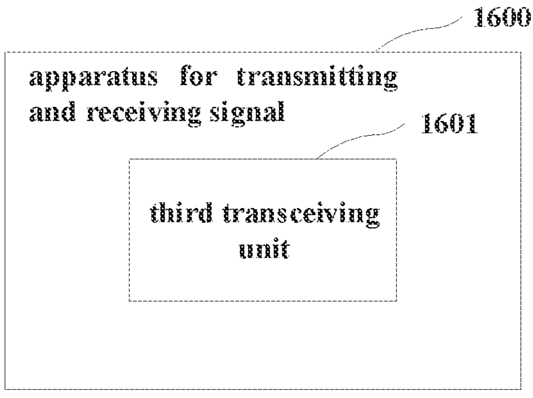
FIG. 16 is a schematic diagram of the apparatus for transmitting and receiving a signal of an embodiment of a seventh aspect.

FIG. 16 is a schematic diagram of the apparatus for transmitting and receiving a signal of the embodiment of the seventh aspect. As shown in FIG. 16, an apparatus 1600 for transmitting and receiving a signal includes a third transceiving unit 1601, the third transceiving unit 1601 being configured to:

receive a first RRC reconfiguration message transmitted by the first IAB-donor-CU; and transmit an RRC reconfiguration complete message to the first IAB-donor-CU.

In at least one embodiment, the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the IAB-node, the TNL address being anchored to a second IAB-donor-DU in topology of the second IAB-donor-CU, wherein the RRC reconfiguration complete (RRCReconfigurationComplete) message is used to indicate that the IAB-node has received the first RRC reconfiguration message. Furthermore, the RRC reconfiguration complete message may indicate that the IAB-node has completed reconfiguration.

In at least one embodiment, the third transceiving unit 1601 is further configured to:

receive, by the IAB-node, a second RRC reconfiguration message transmitted by the second IAB-donor-CU, the second RRC reconfiguration message including BAP configuration information (bap-Config), the BAP configuration information including a second BAP address configured for the IAB-node; and transmit a reconfiguration complete message by the IAB-node to the second IAB-donor-CU, wherein the reconfiguration complete message is used to indicate that the IAB-node has received the second RRC Reconfiguration message.

In at least one embodiment, the third transceiving unit 1601 is further configured to:

associate the second BAP address with a master cell group (MCG)/secondary cell group (SCG) or a master node (MN)/secondary node (SN) by the IAB-node.

In at least one embodiment, if the second RRCReconfiguration message carrying the second BAP address received by the IAB-node is from the MCG or is received via a signaling radio bearer (SRB) 1, the second BAP address is associated with the MCG or the MN;

and if the second RRCReconfiguration message carrying the second BAP address received by the IAB-node is from the SCG or is received via SRB3, the second BAP address is associated with the SCG or the SN.

In at least one embodiment, a bap configuration information element (bap-Config IE) of the first RRC reconfiguration message includes a field used for indicating a second BAP address configured for the IAB-node; or a BAP address field in the bap configuration information element (bap-Config IE) of the first RRC reconfiguration message includes a list, each entry in the list being a BAP address and its associated information.

Reference may be made to the description of the method in the embodiment of the third aspect for detailed description of the third transceiving unit 1601.

Embodiment of an Eighth Aspect

The embodiment of this disclosure provides an apparatus for transmitting and receiving a signal, applicable to a descendant node of an IAB-node. The apparatus may be the descendant node, or may be one or more components or assemblies configured in the descendant node. The apparatus corresponds to the method of the embodiment of the fourth aspect.

Figure 17:
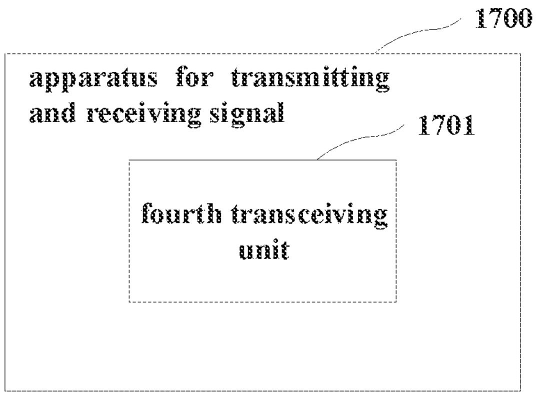
FIG. 17 is a schematic diagram of the apparatus for transmitting and receiving a signal of an embodiment of an eighth aspect.

FIG. 17 is a schematic diagram of the apparatus for transmitting and receiving a signal of the embodiment of the eighth aspect. As shown in FIG. 17, an apparatus 1700 for transmitting and receiving a signal includes a fourth transceiving unit 1701, the fourth transceiving unit 1701 being configured to:

receive a first RRC reconfiguration message transmitted by the first IAB-donor-CU; and transmit an RRC reconfiguration complete message to the first IAB-donor-CU, wherein the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the descendant node, the TNL address being anchored to a second IAB-donor-DU in topology of the second IAB-donor-CU;

and wherein the RRC reconfiguration complete message is used to indicate that the descendant node has received the first RRC reconfiguration message. Furthermore, the RRC reconfiguration complete message may indicate that the descendant node has completed reconfiguration.

Reference may be made to the description of the method in the embodiment of the fourth aspect for detailed description of the fourth transceiving unit 1701.

Embodiment of a Ninth Aspect

The embodiment of this disclosure provides a communication system, and reference may be made to FIG. 1, with contents identical to those in the embodiments of the first to eighth aspects being not going to be described herein any further.

In some embodiments, the communication system may include:

a first IAB-donor-CU, including the apparatus 1400 for transmitting and receiving a signal as described in the embodiment of the fifth aspect;

a second IAB-donor-CU, including the apparatus 1500 for transmitting and receiving a signal as described in the embodiment of the sixth aspect;

an IAB-node, including the apparatus 1600 for transmitting and receiving a signal as described in the embodiment of the seventh aspect; and a descendant node of an IAB-node, including the apparatus 1700 for transmitting and receiving a signal as described in the embodiment of the eighth aspect.

The IAB-node may include an IAB-MT functional unit and an IAB-DU functional unit, the IAB-MT functional unit having a structure identical to a terminal equipment, and the IAB-DU functional unit, the first IAB-donor-CU and a second IAB-donor-CU having units identical to a network device.

Figure 18:
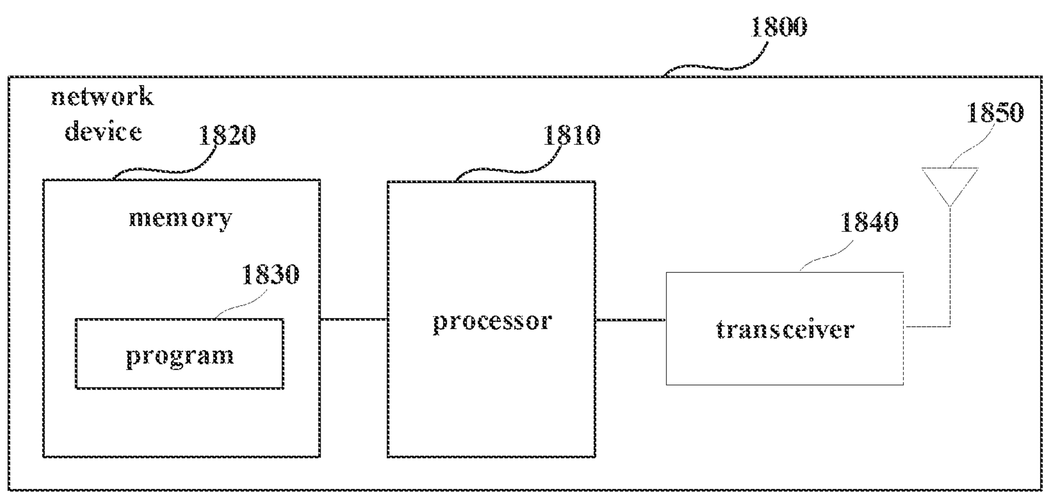
FIG. 18 is a schematic diagram of a structure of the network device of an embodiment of this disclosure.

FIG. 18 is a schematic diagram of a structure of the network device of the embodiment of this disclosure. As shown in FIG. 18, a network device 1800 may include a processor 1810 (such as a central processing unit (CPU)) and a memory 1820, the memory 1820 being coupled to the processor 1810. The memory 1820 may store various data, and furthermore, it may store a program 1830 for information processing, and execute the program 1830 under control of the processor 1810.

For example, the processor 1810 may be configured to execute a program to carry out the method executed by the IAB-DU in the embodiment of the first aspect or the second aspect or the method executed by the IAB-DU in the embodiment of the third aspect or the fourth aspect.

Furthermore, as shown in FIG. 18, the network device 1800 may include a transceiver 1840, and an antenna 1850, etc. Functions of the above components are similar to those in the related art, and shall not be described herein any further. It should be noted that the network device 1800 does not necessarily include all the parts shown in FIG. 18, and furthermore, the network device 1800 may include parts not shown in FIG. 18, and the related art may be referred to. Moreover, the IAB-donor-CU and IAB-donor-DU may exist in a node and serve as a network device IAB-donor, or may be separated into two nodes, which respectively execute functions different from those of a network device, and reference may be made to existing techniques.

Figure 19:
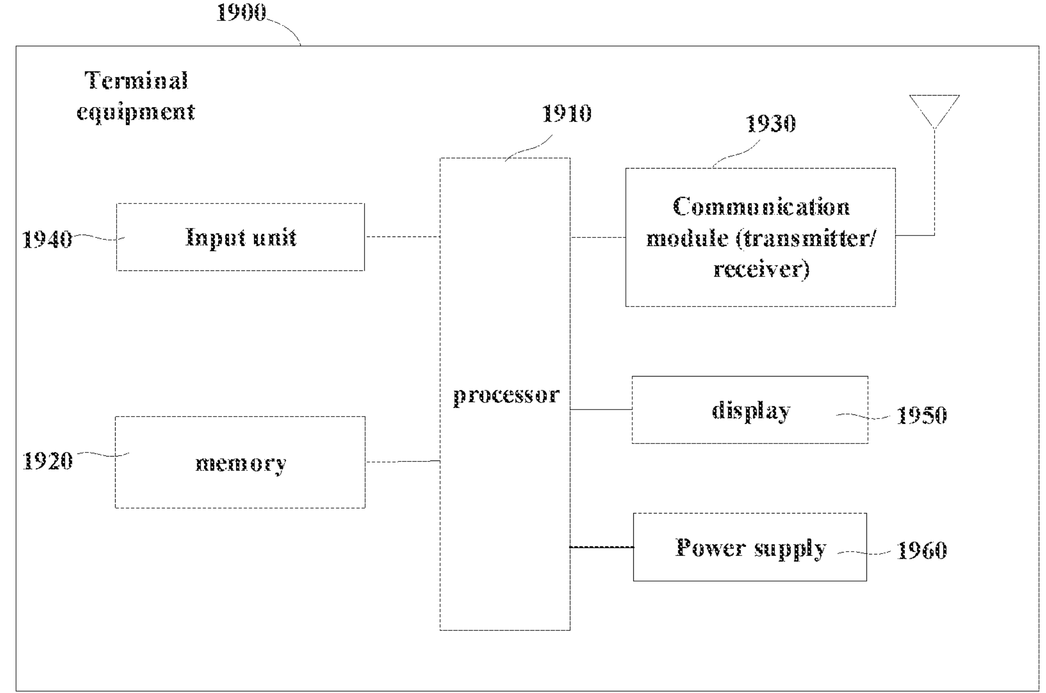
FIG. 19 is a schematic diagram of the terminal equipment of an embodiment of this disclosure.

FIG. 19 is a schematic diagram of the terminal equipment in the embodiment of this disclosure. As shown in FIG. 19, a terminal equipment 1900 may include a processor 1910 and a memory 1920, the memory 1920 storing data and a program and being coupled to the processor 1910. It should be noted that this figure is illustrative only, and other types of structures may also be used, so as to supplement or replace this structure and achieve a telecommunications function or other functions. For example, the processor 1910 may be configured to execute a program to carry out the method executed by the IAB-MT in the embodiment of the third or fourth aspect.

As shown in FIG. 19, the terminal equipment 1900 may further include a communication module 1930, an input unit 1940, a display 1950, and a power supply 1960; wherein functions of the above components are similar to those in the related art, which shall not be described herein any further. It should be noted that the terminal equipment 1900 does not necessarily include all the parts shown in FIG. 19, and the above components are not necessary. Furthermore, the terminal equipment 1900 may include parts not shown in FIG. 19, and the related art may be referred to.

An embodiment of this disclosure provides a computer readable program, which, when executed in a donor-CU, causes the donor-CU to carry out the method as described in the embodiment of the first or second aspect.

An embodiment of this disclosure provides a computer storage medium, including a computer readable program, which causes a donor-CU to carry out the method as described in the embodiment of the first or second aspect.

An embodiment of this disclosure provides a computer readable program, which, when executed in an IAB or its descendant node, causes the IAB node or its descendant node to carry out the method for transmitting and receiving a signal as described in the embodiment of the third or fourth aspect.

An embodiment of this disclosure provides a computer storage medium, including a computer readable program, which causes an IAB node or its descendant node to carry out the method for transmitting and receiving a signal as described in the embodiment of the third or fourth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

A method at a first IAB-donor-CU side:

1. A method for transmitting and receiving a signal, applicable to a first integrated access and backhaul node donor central unit (IAB-donor-CU), the method including:

transmitting a traffic offloading request to a second IAB-donor-CU; and receiving a response of agreement of traffic offloading or a response of rejection of traffic offloading transmitted by the second IAB-donor-CU.

2. The method according to supplement 1, wherein the method further includes:

transmitting a first RRC reconfiguration message to an IAB-node and/or a descendant IAB-node of the IAB-node according to the response of agreement of traffic offloading, wherein the first RRC reconfiguration message includes at least one TNL address allocated respectively for a DU of the IAB-node and/or that of the descendant node of the IAB-node, the TNL address being anchored to a second IAB-donor-DU in topology of the second IAB-donor-CU, the IAB-node is connected to a first parent node, the first parent node being a node in the topology of the first IAB-donor-CU, and the IAB-node is already or is to be connected to a second parent node, the second parent node being a node in the topology of the second IAB-donor-CU.

3. The method according to supplement 2, wherein, a BAP configuration information element (bap-Config IE) of the first RRC reconfiguration message includes a field used for indicating a second BAP address configured for the IAB-node; or a BAP address field in the BAP configuration information element (bap-Config IE) of the first RRC reconfiguration message includes a list, each entry in the list being a BAP address and its associated information.

4. The method according to supplement 2, wherein the method further includes:

when a new TNL address is allocated, adding the new TNL address into F1-C association of a DU of the IAB-node and/or the descendant node of the IAB-node with the first IAB-donor-CU.

5. The method according to supplement 1, wherein, the traffic offloading request includes a request for setting up a redundant path for the IAB-node and/or the descendant node of the IAB-node.

6. The method according to supplement 5, wherein the method further includes:

performing BH RLC channel configuration and BAP sublayer routing entry configuration by the first IAB-donor-CU between the IAB-node and the descendant node of the IAB-node, so as to support routing and BH RLC channel mapping of a second path.

7. The method according to supplement 5, wherein the method further includes:

performing BAP routing identifier mapping on the IAB-node by the first IAB-donor-CU according to the response of agreement of traffic offloading.

8. The method according to supplement 5, wherein the method further includes:

migrating an F1-U tunnel between the first IAB-donor-CU and the DU of the IAB-node and/or the descendant node of the IAB-node from a first path to the second path by the first IAB-donor-CU via a UE context modification request message or a UE context setup request message.

9. The method according to supplement 1, wherein, the response of agreement of traffic offloading indicates that the traffic offloading request is at least partially accepted, wherein that the traffic offloading request is at least partially accepted refers to that redundant paths are set up for some TNL-associated F1-Cs or for some F1-U tunnels.

10. The method according to supplement 1, wherein, the IAB-node is connected to a first parent node, and the IAB-node is connected to a second parent node, the first parent node being a node in the topology of the first IAB-donor-CU, and the second parent node being a node in the topology of the second IAB-donor-CU, and the traffic offloading request is included in a traffic offloading request message, the response of agreement of traffic offloading is included in a traffic offloading request acknowledge message, and the response of rejection of traffic offloading is included in a traffic offloading request reject message.

11. The method according to supplement 10, wherein, the traffic offloading request message includes at least one of the following:

an identifier of a user equipment of a traffic offloading initiating node at an Xn interface (UE XnAP ID), a BAP address of access IAB-node, a TNL address, one or more pieces of F1-C identification information, one or more pieces of F1-U tunnel identification information, IP header information of an F1-C and/or F1-U tunnels, and QoS information of the F1-U tunnels.

12. The method according to supplement 11, wherein, in a case where a traffic offloading request for an F1-C and/or F1-U tunnel is accepted, the traffic offloading request acknowledge message includes at least one of the following:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, and a second BAP address of the IAB-node.

13. The method according to supplement 11, wherein, in a case where traffic offloading requests for all F1-Cs and F1-U tunnels are rejected, the traffic offloading request reject message includes a UE XnAP ID of the traffic offloading initiating node.

14. The method according to supplement 1, wherein, the IAB-node is connected to the first parent node, and the IAB-node is connected to the second parent node, the first parent node being a node in the topology of the first IAB-donor-CU, and the second parent node being a node in the topology of the second IAB-donor-CU, the first IAB-donor-CU is a master node (MN), and contents of the traffic offloading request and contents of the response of agreement of traffic offloading or contents of the response of rejection of traffic offloading are taken as information elements (IEs) and contained in a message of an S-NG-RAN node modification preparation procedure of an XnAP.

15. The method according to supplement 1, wherein, the IAB-node is connected to the first parent node, and the IAB-node is not connected to the second parent node, the first parent node being a node in the topology of the first IAB-donor-CU, and the second parent node being a node in the topology of the second IAB-donor-CU, and contents of the traffic offloading request and contents of the response of agreement of traffic offloading or contents of the response of rejection of traffic offloading are taken as information elements (IEs) and contained in a message of an S-NG-RAN node addition preparation procedure of an XnAP.

16. The method according to supplement 15, wherein, the traffic offloading request is included in a secondary node addition request (S-NODE ADDITION REQUEST) message transmitted by the first IAB-donor-CU to the second IAB-donor-CU.

17. The method according to supplement 15, wherein, the response of agreement of traffic offloading is included in a secondary node addition request acknowledge (S-NODE ADDITION REQUEST ACKNOWLEDGE) message transmitted by the second IAB-donor-CU to the first IAB-donor-CU.

18. The method according to supplement 1, wherein the method further includes:

transmitting or receiving a redundant path release request by the first IAB-donor-CU; and receiving or transmitting a redundant path release request acceptance message by the first IAB-donor-CU.

19. The method according to supplement 18, wherein, the redundant path release request includes a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path.

20. The method according to supplement 18, wherein, in a case where MN of the first IAB-donor-CU and the second IAB-donor-CU transmits redundant path release requests, contents of the redundant path release request and contents of the redundant path release request acceptance message are taken as IEs and contained in the S-NG-RAN node modification preparation procedure.

21. The method according to supplement 1, wherein, in performing a secondary base station node release (S-NG-RAN node Release) procedure of the IAB-node, all redundant paths related to the IAB-node in the SN topology are released.

A method at a second IAB-donor-CU side:

1. A method for transmitting and receiving a signal, applicable to a second integrated access and backhaul node donor central unit (IAB-donor-CU), the method including:

receiving a traffic offloading request transmitted by a first IAB-donor-CU; and transmitting a response of agreement of traffic offloading or a response of rejection of traffic offloading to the first IAB-donor-CU.

2. The method according to supplement 1, wherein, the traffic offloading request includes a request for setting up a redundant path for an IAB-node and/or a descendant node of the IAB-node.

3. The method according to supplement 1, wherein the method further includes:

when the IAB-node is already connected to a second parent node, transmitting a UE context modification request message by the second IAB-donor-CU to the second parent node to modify a user equipment (UE) context of a mobile terminal (MT) of the IAB-node, and set at least one bearer, wherein the second parent node is a node in topology of the second IAB-donor-CU.

4. The method according to supplement 1, wherein the method further includes:

when the IAB-node is not connected to the second parent node, transmitting a UE context setup request message by the second IAB-donor-CU to the second parent node to set up a UE context of an MT of the IAB, and set at least one bearer, wherein the second parent node is a node in topology of the second IAB-donor-CU.

5. The method according to supplement 3 or 4, wherein the method further includes:

transmitting a second reconfiguration (RRCReconfiguration) message by the second IAB-donor-CU to the mobile terminal (MT) of the IAB-node, the second RRCReconfiguration message including BAP configuration information (bap-Config), the BAP configuration information including a second BAP address configured for the IAB-node.

6. The method according to supplement 3 or 4, wherein the method further includes:

for a second path required by the IAB-node and/or the descendant node of the IAB-node, performing BH RLC channel configuration and BAP sublayer routing entry configuration between the IAB-node and a second IAB-donor-DU by the second IAB-donor-CU, the second IAB-donor-DU being in the topology of the second IAB-donor-CU.

7. The method according to supplement 1, wherein, the response of agreement of traffic offloading indicates that the traffic offloading request is at least partially accepted, wherein that the traffic offloading request is at least partially accepted refers to that redundant paths are set up for some TNL-associated F1-Cs or for some F1-U tunnels.

8. The method according to supplement 1, wherein, the IAB-node is connected to a first parent node, and the IAB-node is also connected to a second parent node, the first parent node being a node in the topology of the first IAB-donor-CU, and the second parent node being a node in the topology of the second IAB-donor-CU, and the traffic offloading request is included in a traffic offloading request message, the response of agreement of traffic offloading is included in a traffic offloading request acknowledge message, and the response of rejection of traffic offloading is included in a traffic offloading request reject message.

9. The method according to supplement 8, wherein, the traffic offloading request message includes at least one of the following:

an identifier of a user equipment of a traffic offloading initiating node at an Xn interface (UE XnAP ID), a BAP address of an access IAB-node, a TNL address, one or more pieces of F1-C identification information, one or more pieces of F1-U tunnel identification information, IP header information of an F1-C and/or F1-U tunnels, and QoS information of the F1-U tunnels.

10. The method according to supplement 9, wherein, in a case where a traffic offloading request for an F1-C and/or F1-U tunnel is accepted, the traffic offloading request acknowledge message includes at least one of the following:

a UE XnAP ID of the traffic offloading initiating node, a UE XnAP ID of a traffic offloading accepting node, identification information of the F1-C and/or the F1-U tunnel, a TNL address newly allocated for a DU of an access IAB-node, a BH RLC channel identifier on a link between a dual-connecting IAB-node and a second parent node configured for the F1-C and/or the F1-U tunnel, a BAP address of the second parent node, a BAP routing identifier in a topology controlled by the second IAB-donor-CU, and a second BAP address of the IAB-node.

11. The method according to supplement 9, wherein, in a case where traffic offloading requests for all F1-Cs and F1-U tunnels are rejected, the traffic offloading request reject message includes a UE XnAP ID of the traffic offloading initiating node.

12. The method according to supplement 1, wherein, the IAB-node is connected to the first parent node, and the IAB-node is also connected to the second parent node, the first parent node being a node in the topology of the first IAB-donor-CU, and the second parent node being a node in the topology of the second IAB-donor-CU, the first IAB-donor-CU is a master node (MN), and contents of the traffic offloading request and contents of the response of agreement of traffic offloading or contents of the response of rejection of traffic offloading are taken as information elements (IEs) and contained in messages of an S-NG-RAN node modification preparation procedure of an XnAP.

13. The method according to supplement 1, wherein, the IAB-node is connected to the first parent node, and the IAB-node is not connected to the second parent node, the first parent node being a node in the topology of the first IAB-donor-CU, and the second parent node being a node in the topology of the second IAB-donor-CU, and contents of the traffic offloading request and contents of the response of agreement of traffic offloading or contents of the response of rejection of traffic offloading are taken as information elements (IEs) and contained in messages of an S-NG-RAN node addition preparation procedure of an XnAP.

14. The method according to supplement 13, wherein, the traffic offloading request is included in a secondary node addition request (S-NODE ADDITION REQUEST) message transmitted by the first IAB-donor-CU to the second IAB-donor-CU.

15. The method according to supplement 13, wherein, the response of agreement of traffic offloading is included in a secondary node addition request acknowledge (S-NODE ADDITION REQUEST ACKNOWLEDGE) message transmitted by the second IAB-donor-CU to the first IAB-donor-CU.

16. The method according to supplement 1, wherein the method further includes:

receiving or transmitting a redundant path release request by the second IAB-donor-CU; and transmitting or receiving a redundant path release request acceptance message by the second IAB-donor-CU.

17. The method according to supplement 16, wherein, the redundant path release request includes a UE XnAP ID of the traffic offloading initiating node, a UE XnAP ID of the traffic offloading accepting node, and a TNL address with which an F1-C needing to release a redundant path is associated, or user plane transport layer information (UP Transport Layer Information) of an F1-U tunnel needing to release a redundant path.

18. The method according to supplement 16, wherein, in a case where MN of the first IAB-donor-CU and the second IAB-donor-CU transmits redundant path release requests, contents of the redundant path release request and contents of the redundant path release request acceptance message are taken as IEs and contained in the S-NG-RAN node modification preparation procedure.

19. The method according to supplement 1, wherein, in performing a secondary base station node release (S-NG-RAN node Release) procedure of the IAB-node, all redundant paths related to the IAB-node in the SN topology are released.

A method at a dual-connecting IAB-node side:

1. A method for transmitting and receiving a signal, applicable to an IAB-node, the IAB-node being connected to a first parent node, and the IAB-node being already or being to be connected to a second parent node, the first parent node being a node in topology of a first IAB-donor-CU, and the second parent node being a node in topology of a second IAB-donor-CU, the method including:

receiving a first RRC reconfiguration message transmitted by the first IAB-donor-CU; and transmitting an RRC reconfiguration complete message to the first IAB-donor-CU, wherein the first RRC reconfiguration message is generated according to a response of agreement of traffic offloading transmitted by the second IAB-donor-CU to the first IAB-donor-CU, and the first RRC reconfiguration message includes at least one TNL address allocated for a DU of the IAB-node, the TNL address being anchored to a second IAB-donor-DU in topology of the second IAB-donor-CU;

and wherein the RRC reconfiguration complete message is used to indicate that the IAB-node has received the first RRC reconfiguration message.

2. The method according to supplement 1, wherein the method further includes:

receiving, by the IAB-node, a second RRC reconfiguration message transmitted by the second IAB-donor-CU, the second RRC reconfiguration message including BAP configuration information (bap-Config), the BAP configuration information including a second BAP address configured for the IAB-node; and transmitting an RRC reconfiguration complete message by the IAB-node to the second IAB-donor-CU, wherein the RRC reconfiguration complete message is used to indicate that the IAB-node has received the second RRC Reconfiguration message.

3. The method according to supplement 2, wherein the method further includes:

associating the second BAP address with a master cell group (MCG)/secondary cell group (SCG) or a master node (MN)/secondary node (SN) by the IAB-node.

4. The method according to supplement 3, wherein, if the second RRCReconfiguration message carrying the second BAP address received by the IAB-node is from the MCG or is received via a signaling radio bearer (SRB) 1, the second BAP address is associated with the MCG or the MN;

and if the second RRCReconfiguration message carrying the second BAP address received by the IAB-node is from the SCG or is received via SRB3, the second BAP address is associated with the SCG or the SN.

5. The method according to supplement 1, wherein, a bap configuration information element (bap-Config IE) of the first RRC reconfiguration message includes a field used for indicating a second BAP address configured for the IAB-node; or a BAP address field in the bap configuration information element (bap-Config IE) of the first RRC reconfiguration message includes a list, each entry in the list being a BAP address and its associated information.

A method at a descendant node side:

1. A method for transmitting and receiving a signal, applicable to a descendant node of an IAB-node, the IAB-node being connected to a first parent node, and the IAB-node being already or being to be connected to a second parent node, the first parent node being a node in topology of a first IAB-donor-CU, and the second parent node being a node in topology of a second IAB-donor-CU, the method including:

receiving a first RRC reconfiguration message transmitted by the first IAB-donor-CU; and transmitting an RRC reconfiguration complete message to the first IAB-donor-CU, wherein the first RRC reconfiguration message is generated according to a response of agreement of traffic offloading transmitted by the second TAB-donor-CU to the first TAB-donor-CU, and the first RRC reconfiguration message includes at least one TNL address allocated for a DU of the descendant node, the TNL address being anchored to a second IAB-donor-DU in topology of the second TAB-donor-CU;

and wherein the RRC reconfiguration complete message is used to indicate that the descendant node has received the first RRC reconfiguration message.

What is claimed is:

1. An apparatus for transmitting and receiving signals, applicable to a first integrated access and backhaul node donor central unit (IAB-donor-CU), the apparatus comprising first controller circuitry configured to:

transmit a traffic offload request to a second IAB-donor-CU;

receive a reply of agreement of traffic offload or a reply of rejection of traffic offload transmitted by the second IAB-donor-CU; and transmit a first RRC reconfiguration message to an IAB node and/or a descendant IAB node of the IAB node via the IAB node after receiving the reply of agreement of traffic offload, wherein the first RRC reconfiguration message comprises at least one TNL address allocated for the IAB node and/or the descendant node of the IAB node, the TNL address being anchored to a second IAB-donor-DU, and the IAB node is connected to a first parent node, the first parent node being a node in a topology of the first IAB-donor-CU, and the IAB node is already or is to be connected to a second parent node, the second parent node being a node in a topology of the second IAB-donor-CU.

2. The apparatus according to claim 1, wherein the first controller circuitry is further configured to:

when a new TNL address is allocated, add the new TNL address into F1-C association of a DU of the IAB node and/or the descendant node of the IAB node with the first IAB-donor-CU.

3. The apparatus according to claim 1, wherein, the traffic offload request comprises a request for setting up a redundant path for the IAB node and/or the descendant node of the IAB node.

4. The apparatus according to claim 3, wherein the first controller circuitry is further configured to:

perform BAP routing identifier mapping on the IAB node by the first IAB-donor-CU according to the reply of agreement of traffic offload.

5. The apparatus according to claim 3, wherein the first controller circuitry is further configured to:

perform BH RLC channel configuration and BAP sublayer routing entry configuration by the first IAB-donor-CU between the IAB node and the descendant node of the IAB node, so as to support routing and BH RLC channel mapping of a second path.

6. The apparatus according to claim 1, wherein, the reply of agreement of traffic offload indicates that the traffic offload request is at least partially accepted, and wherein that the traffic offload request is at least partially accepted refers to that redundant paths are set up for some TNL-associated F1-Cs or for some F1-Us.

7. An apparatus for transmitting and receiving signals, applicable to a first integrated access and backhaul node donor central unit (IAB-donor-CU), the apparatus comprising first controller circuitry configured to:

transmit a traffic offload request to a second IAB-donor-CU; and receive a reply of agreement of traffic offload or a reply of rejection of traffic offload transmitted by the second IAB-donor-CU, wherein, the IAB node is connected to a first parent node, and the IAB node is connected to a second parent node, the first parent node being a node in a topology of the first IAB-donor-CU, and the second parent node being a node in a topology of the second IAB-donor-CU, and the traffic offload request is contained in a traffic offload request message, the reply of agreement of traffic offload is contained in a traffic offload request acknowledge message, and the reply of rejection of traffic offload is contained in a traffic offload request reject message.

8. The apparatus according to claim 7, wherein, the traffic offload request message comprises at least one of the following:

an identifier of a user equipment of a traffic offload initiating node at an Xn interface (UE XnAP ID), a TNL address, one or more pieces of F1-C index, one or more pieces of F1-U index, and QoS information of the F1-U.

9. The apparatus according to claim 8, wherein, in a case where a traffic offload request for a F1-C and/or F1-U is accepted, the traffic offload request acknowledge message comprises at least one of the following:

a UE XnAP ID of the traffic offload initiating node, a UE XnAP ID of a traffic offload accepting node, identification information of the F1-C and/or the F1-U, a TNL address newly allocated for of an IAB node, a BH RLC channel identifier on a link between a dual-connectivity IAB node and a second parent node configured for the F1-C and/or the F1-U, a BAP address of the second parent node, a BAP routing identifier in a topology controlled by the second IAB-donor-CU.

10. The apparatus according to claim 8, wherein, in a case where traffic offload requests for all F1-Cs and F1-U channels are rejected, the traffic offload request reject message comprises a UE XnAP ID of the traffic offload initiating node.

11. The apparatus according to claim 1, wherein the first controller circuitry is further configured to:

transmit or receive a redundant path release request for the first IAB-donor-CU; and receive or transmit a redundant path release request acceptance message for the first IAB-donor-CU.

12. The apparatus according to claim 11, wherein, the redundant path release request comprises a UE XnAP ID of the traffic offload initiating node, a UE XnAP ID of the traffic offload receiving node, and a TNL address with which an F1-C needing to release a redundant path is associated, or user plane transport layer information (UP Transport Layer Information) of an F1-U channel needing to release a redundant path.

13. The apparatus according to claim 1, wherein, in performing a secondary base station node release (S-NG-RAN node Release) process of the IAB node, all redundant paths related to the IAB node in a SN topology are released.

14. An apparatus for transmitting and receiving signals, applicable to a second integrated access and backhaul node donor central unit (IAB-donor-CU), the apparatus comprising a-second controller circuitry configured to:

receive a traffic offload request transmitted by a first IAB-donor-CU; and transmit a reply of agreement of traffic offload or a reply of rejection of traffic offload to the first IAB-donor-CU, wherein the first IAB-donor-CU transmits a first RRC reconfiguration message to an IAB node and/or a descendant IAB node of the IAB node via the IAB node after receiving the reply of agreement of traffic offload, the first RRC reconfiguration message comprises at least one TNL address allocated for the IAB node and/or the descendant node of the IAB node, the TNL address being anchored to a second IAB-donor-DU, and the IAB node is connected to a first parent node, the first parent node being a node in a topology of the first IAB-donor-CU, and the IAB node is already or is to be connected to a second parent node, the second parent node being a node in a topology of the second IAB-donor-CU.

15. The apparatus according to claim 14, wherein, the traffic offload request comprises a request for setting up a redundant path for an IAB node and/or a descendant node of the IAB node.

16. An apparatus for transmitting and receiving signals, applicable to an IAB node, the IAB node being connected to a first parent node, and the IAB node being already or being to be connected to a second parent node, the first parent node being a node in topology of a first IAB-donor-CU, and the second parent node being a node in topology of a second IAB-donor-CU, the apparatus comprising third controller circuitry configured to:

receive, by the IAB node, a second RRC reconfiguration message transmitted by the second IAB-donor-CU, the second RRC reconfiguration message comprising BAP configuration information (bap-Config), the BAP configuration information including a second BAP address configured for the IAB node; and transmit an RRC reconfiguration complete message by the IAB node to the second IAB-donor-CU, wherein the RRC reconfiguration complete message is used to indicate that the IAB node has received the second RRC Reconfiguration message.

17. The apparatus according to claim 16, wherein the third controller circuitry is further configured to:

associate the second BAP address with a master cell group (MCG)/secondary cell group (SCG) or a master node (MN)/secondary node (SN) by the IAB node.

18. The apparatus according to claim 17, wherein, if the second RRC reconfiguration message carrying the second BAP address received by the IAB node is from the MCG or is received via a signaling radio bearer (SRB) 1, the second BAP address is associated with the MCG or the MN; and if the second RRC reconfiguration message carrying the second BAP address received by the IAB node is from the SCG or is received via SRB3, the second BAP address is associated with the SCG or the SN.

* * * * *